United States Patent
Phillips et al.

(10) Patent No.: US 7,224,528 B2
(45) Date of Patent: *May 29, 2007

(54) OPTICALLY VARIABLE SECURITY DEVICES

(75) Inventors: Roger W. Phillips, Santa Rosa, CA (US); Richard L. Bonkowski, Santa Rosa, CA (US); Patrick K. Higgins, Windsor, CA (US); Charles T. Markantes, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/047,389

(22) Filed: Jan. 31, 2005

(65) Prior Publication Data

US 2005/0128543 A1 Jun. 16, 2005

Related U.S. Application Data

(60) Continuation of application No. 10/705,610, filed on Nov. 10, 2003, now abandoned, which is a division of application No. 09/489,250, filed on Jan. 21, 2000, now abandoned.

(51) Int. Cl.
*G02B 1/10* (2006.01)
*G02B 5/18* (2006.01)
*B32B 3/00* (2006.01)
*B32B 7/02* (2006.01)

(52) U.S. Cl. ............ 359/584; 359/585; 359/576; 428/156; 428/212

(58) Field of Classification Search ............ 359/2, 359/567, 572, 576, 585; 430/1; 428/156, 428/212
See application file for complete search history.

(56) References Cited

U.S. PATENT DOCUMENTS 3,011,383 A 12/1961 Sylvester et al. ............ 88/1

(Continued)

FOREIGN PATENT DOCUMENTS

DE 4212290 5/1993

(Continued)

OTHER PUBLICATIONS

John M. McKiernan et al., "Luminescence and Laser Action of Coumarin Dyes Doped in Silicate and Aluminosilicate Glasses Prepared by the Sol-Gel Technique", Journal of Inorganic and Organometallic Polymers, vol. 1, No. 1, 1991, pp. 87-103.

(Continued)

*Primary Examiner*—Audrey Chang
(74) *Attorney, Agent, or Firm*—Allen, Dyer, Doppelt, Milbrath & Gilchrist, P.A.

(57) ABSTRACT

A security article includes a light transmissive substrate having a first surface and an opposing second surface, with the first surface having an optical interference pattern such as a holographic image pattern or an optical diffraction pattern thereon. A color shifting optical coating is formed on the substrate such as on the interference pattern or on the opposing second surface of the substrate, with the optical coating providing an observable color shift as the angle of incident light or viewing angle changes. Various processes can be utilized to form the security article, such as vacuum coating processes, lamination, laser scribing, and laser imaging. The security article can be affixed to a variety of objects through various attachment mechanisms, such as pressure sensitive adhesives or hot stamping processes, to provide for enhanced security measures such as anticounterfeiting.

30 Claims, 13 Drawing Sheets

U.S. PATENT DOCUMENTS

| | | | |
|---|---|---|---|
| 3,676,273 A | 7/1972 | Graves | 428/328 |
| 3,853,676 A | 12/1974 | Graves | 161/5 |
| 4,066,280 A | 1/1978 | LaCapria | 283/91 |
| 4,099,838 A | 7/1978 | Cook et al. | 359/537 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,434,010 A | 2/1984 | Ash | 106/415 |
| 4,705,300 A | 11/1987 | Berning et al. | 283/91 |
| 4,705,356 A | 11/1987 | Berning et al. | 359/590 |
| 4,721,217 A | 1/1988 | Phillips et al. | 215/230 |
| 4,756,771 A | 7/1988 | Brodalla et al. | 148/6.1 |
| 4,779,898 A | 10/1988 | Berning et al. | 283/91 |
| 4,838,648 A * | 6/1989 | Phillips et al. | 359/585 |
| 4,867,793 A | 9/1989 | Franz et al. | 106/415 |
| 4,930,866 A | 6/1990 | Berning et al. | 359/589 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,084,351 A | 1/1992 | Philips et al. | 428/411.1 |
| 5,106,125 A | 4/1992 | Antes | 283/91 |
| 5,135,812 A | 8/1992 | Phillips et al. | 428/403 |
| 5,171,363 A | 12/1992 | Phillips et al. | 106/31.65 |
| 5,214,530 A | 5/1993 | Coombs et al. | 359/359 |
| 5,223,360 A | 6/1993 | Prengel et al. | 430/39 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,364,467 A | 11/1994 | Schmid et al. | 106/404 |
| 5,464,710 A * | 11/1995 | Yang | 430/1 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,624,076 A | 4/1997 | Miekka et al. | 241/3 |
| RE35,512 E | 5/1997 | Nowak et al. | 101/454 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,763,086 A | 6/1998 | Schmid et al. | 428/404 |
| 5,856,048 A | 1/1999 | Tahara et al. | 430/1 |
| 5,858,078 A | 1/1999 | Andes et al. | 106/437 |
| 5,912,767 A | 6/1999 | Lee | 359/567 |
| 5,989,626 A | 11/1999 | Coombs et al. | 427/162 |
| 6,013,370 A | 1/2000 | Coulter et al. | 428/403 |
| 6,031,457 A | 2/2000 | Bonkowski et al. | 340/572.1 |
| 6,045,230 A | 4/2000 | Dreyer et al. | 359/529 |
| 6,068,691 A | 5/2000 | Miekka et al. | 106/403 |
| 6,112,388 A | 9/2000 | Kimoto et al. | 29/17.3 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,692,830 B2 | 2/2004 | Argoitia et al. | 428/403 |
| 6,749,777 B2 | 6/2004 | Argoitia et al. | 252/582 |
| 6,761,959 B1 * | 7/2004 | Bonkowski et al. | 428/156 |
| 7,005,178 B2 * | 2/2006 | Bonkowski et al. | 428/156 |
| 2003/0058491 A1 | 3/2003 | Holmes et al. | 359/2 |
| 2004/0009309 A1 | 1/2004 | Raksha et al. | 427/598 |
| 2004/0081807 A1 | 4/2004 | Bonkowski et al. | 428/195.1 |
| 2004/0094850 A1 | 5/2004 | Bonkowski et al. | 264/1.34 |
| 2004/0105963 A1 | 6/2004 | Bonkowski et al. | 428/195.1 |

FOREIGN PATENT DOCUMENTS

| | | |
|---|---|---|
| DE | 43 43 387 | 6/1995 |
| EP | 0 756 945 | 2/1997 |
| EP | 1 498 545 A | 1/2005 |
| WO | WO 98/12583 | 3/1998 |
| WO | WO 00/08596 | 2/2000 |
| WO | WO 01/53113 A | 7/2001 |
| WO | 2004/024836 | 3/2004 |

OTHER PUBLICATIONS

Jeffrey I. Zink et al., "Optical Probes and Properties of Alumninosilicate Glasses Prepared by the Sol-Gel Method", Polym. Mater Sci. Eng., 1989, pp. 204-208.

Don W. Tomkins, Kurz Hastings, "Transparent Overlays for Security Printing and Plastic ID Cards", Nov. 1997, pp. 1-8.

The Mearl Corporation brochure for "Mearl Iridescent Film", Peeksill, NY.

J.A. Dobrowolski, K.M. Baird, P.D. Carman, and A Waldorg, "Optical Interference Coatings for Inhibiting of Couterfelting", Optica Acta, 1973, vol. 20, No. 12, pp. 925-937.

The R.D. Mathis Company Manual for "Thin Film Evaporation Source Reference", Long Beach, CA.

Minolta Manual for Precise Color Communication, Color Control From Feeling to Instrumentation, pp. 18, 20, 22, 23, 46, 47, 48 and 49.

Frans Defilet, LGZ Landis & Gyr Zug Corporation, "Kinegrams 'Optical Variable Devices' (OVDs) for Banknotes, Security Documents and Plastic Cards", San Diego, Apr. 1-3. 1987.

S.P. McGrew, "Hologram Counterfeiting: Problems and Solutions", SPIE, vol. 1210 Optical Security and Counterfeiting Systems, 1990, pp. 66-76.

Rudolf L. van Renesse, "Security Design of Valuable Documents and Products", SPIE, vol. 2659, Jun. 1996, pp. 10-20.

Steve McGrew, "Countermeasures Against hologram Counterfeiting", Internet site www.iea.com/nli/publications/countermeasuers.htm, Jan. 6, 2000.

Roger W. Phillips, "Optically Variable Films, Pigments, and Inks", SPIE vol. 1323, Optical Thin Films III: New Development, 1990, pp. 98-109.

Roger W. Philips, and Anton F. Bleikolm, "Optical Coatings for Document Security", Applied Optics, vol. 35, No. 28, Oct. 1, 1996, pp. 5529-5534.

J.A. Dobrowolski, F.C. Ho, and A. Waldorf, "Research on Thin Film Anticounterfeiting Coatings at the National Research Council of Canada", Applied Optics, vol. 28, No. 15, Jul. 15, 1989, pp. 2702-2717.

J. Rolfe, "Optically Variable Devices for Use on Bank Notes", SPIE, vol. 1210 Optical Security and Anticounterfeiting Systems, 1990, pp. 14-19.

OVD Kinegram Cor, "OVD Kinegram Management of Light to Provide Security", Internet site www.kiknegram.com/xhome/home.html, Dec. 17, 1999.

I.M. Boswarva et al., "Roll Coater System for the Production of Optically Variable Devices (OVDs) for Security Applications", Proceedings, 33rd Annual Technical Conference, Society of Vacuum Coaters, 1990, pp. 103-109.

* cited by examiner

OPTICALLY VARIABLE SECURITY DEVICES

CROSS REFERENCE TO RELATED APPLICATION

This is a continuation application of U.S. application Ser. No. 10/705,610, filed Nov. 10, 2003, now abandoned which is a divisional application of U.S. application Ser. No. 09/489,250, filed Jan. 21, 2000 now abandoned and entitled "Optically Variable Security Devices," which are incorporated herein by reference, and to which priority is claimed.

This application is related to U.S. application Ser. No. 09/351,102, filed Jul. 8, 1999, and entitled "Diffractive Surfaces with Color Shifting Backgrounds."

This application is related to U.S. application Ser. No. 10/688,357, filed Oct. 17, 2003, and entitled "Security Articles having Diffractive Surfaces and Color Shifting Backgrounds."

BACKGROUND OF THE INVENTION

1. The Field of the Invention

The present invention is related generally to thin film optical coatings for use in producing security articles. More specifically, the present invention is related to the production of diffractive surfaces such as holograms or gratings having color shifting or optically variable backgrounds which can be used as security articles in a variety of applications.

2. The Relevant Technology

Color shifting pigments and colorants have been used in numerous applications, ranging from automobile paints to anti-counterfeiting inks for security documents and currency. Such pigments and colorants exhibit the property of changing color upon variation of the angle of incident light, or as the viewing angle of the observer is shifted. The primary method used to achieve such color shifting colorants is to disperse small flakes, which are typically composed of multiple layers of thin films having particular optical characteristics, throughout a medium such as paint or ink that may then be subsequently applied to the surface of an object.

Diffraction patterns and embossments, and the related field of holographs, have begun to find wide-ranging practical applications due to their aesthetic and utilitarian visual effects. One very desirable decorative effect is the iridescent visual effect created by a diffraction grating. This striking visual effect occurs when ambient light is diffracted into its color components by reflection from the diffraction grating. In general, diffraction gratings are essentially repetitive structures made of lines or grooves in a material to form a peak and trough structure. Desired optical effects within the visible spectrum occur when diffraction gratings have regularly spaced grooves in the range of hundreds to thousands of lines per millimeter on a reflective surface.

Diffraction grating technology has been employed in the formation of two-dimensional holographic patterns which create the illusion of a three-dimensional image to an observer. Three-dimensional holograms have also been developed based on differences in refractive indices in a polymer using crossed laser beams, including one reference beam and one object beam. Such holograms are called volume holograms or 3D holograms. Furthermore, the use of holographic images on various objects to discourage counterfeiting has found widespread application.

There currently exist several applications for surfaces embossed with holographic patterns which range from decorative packaging such as gift wrap, to security documents such as bank notes and credit cards. Two-dimensional holograms typically utilize diffraction patterns which have been formed on a plastic surface. In some cases, a holographic image which has been embossed on such a surface can be visible without further processing; however, it is generally necessary, in order to achieve maximum optical effects, to place a reflective layer, typically a thin metal layer such as aluminum, onto the embossed surface. The reflective layer substantially increases the visibility of the diffraction pattern embossment.

Every type of first order diffraction structure, including conventional holograms and grating images, has a major shortcoming even if encapsulated in a rigid plastic. When diffuse light sources, such as ordinary room lights or an overcast sky, are used to illuminate the holographic image, all diffraction orders expand and overlap so that the diffraction colors are lost and not much of the visual information contained in the hologram is revealed. What is typically seen is only a silver colored reflection from the embossed surface and all such devices look silvery or pastel, at best, under such viewing conditions. Thus, holographic images generally require direct specular illumination in order to be visualized. This means that for best viewing results, the illuminating light must be incident at the same angle as the viewing angle.

Since the use of security holograms has found widespread application, there exists a substantial incentive for counterfeiters to reproduce holograms which are frequently used in credit cards, banknotes, and the like. Thus, a hurdle that security holograms must overcome to be truly secure, is the ease at which such holograms can be counterfeited. One step and two step optical copying, direct mechanical copying and even re-origination have been extensively discussed over the Internet. Various ways to counteract these methods have been explored but none of the countermeasures, taken alone, has been found to be an effective deterrent.

One of the methods used to reproduce holograms is to scan a laser beam across the embossed surface and optically record the reflected beam on a layer of a material such as a photopolymerizable polymer. The original pattern can subsequently be reproduced as a counterfeit. Another method is to remove the protective covering material from the embossed metal surface by ion etching, and then when the embossed metal surface is exposed, a layer of metal such as silver (or any other easily releasable layer) can be deposited. This is followed by deposition of a layer of nickel, which is subsequently released to form a counterfeiting embossing shim.

Due to the level of sophistication of counterfeiting methods, it has become necessary to develop more advanced security measures. One approach, disclosed in U.S. Pat. Nos. 5,624,076 and 5,672,410 to Miekka et al., embossed metal particles or optical stack flakes are used to produce a holographic image pattern.

A further problem with security holograms is that it is difficult for most people to identify and recollect the respective images produced by such holograms for verification purposes. The ability of the average person to authenticate a security hologram conclusively is compromised by the complexity of its features and by confusion with decorative diffractive packaging. Thus, most people tend to confirm the presence of such a security device rather than verifying the actual image. This provides the opportunity for the use of poor counterfeits or the substitution of commercial holograms for the genuine security hologram.

In other efforts to thwart counterfeiters, the hologram industry has resorted to more complex images such as producing multiple images as the security device is rotated. These enhanced images provide the observer with a high level of "flash" or aesthetic appeal. Unfortunately, this added complexity does not confer added security because this complex imagery is hard to communicate and recollection of such imagery is difficult, if not impossible, to remember.

U.S. Pat. No. 5,700,550 issued Dec. 23, 1997 in the name of Uyama et al. discloses a transparent hologram seal having a hologram forming layer embodied by a relief type hologram image, a transparent evaporated layer in the form of a multi-layered ceramic layer having alternatively laminating high-refractive index layers and low-refractive index layers. Uyama discloses 5 layers having a thickness of preferably less than 1 μm as being optimum for color shifting. The notion of using both a hologram relief structure and an optically variable filter provides additional security features to using only a hologram or only a thin film filter. Notwithstanding, an objective in providing a security device having both a hologram and a thin film filter is to allow the user or authenticator to quickly identify these security features so as to validate a document or item which carry them. Furthermore, it would be an object of this invention to provide a synergistic effect by combining a hologram with a thin film optically variable filter. Embodiments of this invention exploit the fact that there is interaction between the diffraction grating and the optically variable structure, which yield desirable and visible effects, not seen in security devices only having a hologram or only having a color shifting filter. By providing a device with high chroma, these effect are enhanced.

Uyama in U.S. Pat. No. 5,700,550 provides a transparent hologram seal that requires an all dielectric stack on the hologram forming layer. Unfortunately, when this device is affixed to a security document having a white background, as for example, a white sheet of paper or a white document, it is found that the transmitted beam will reflect off of the white surface, returning though the device adding to the reflected rays, resulting in a washed out or pale pastel color. The instant invention ameliorates this problem by providing a non-transmissive, substantially opaque device. In contrast the instant device provides reflected colors that are highly saturated, having high chroma irrespective of the color of the document surface. Furthermore, only three color shifting layers are required to achieve this high chroma in contrast to Uyama's five layers. Uyama's patent discloses an attempt at using three transparent dielectric layers however it was reported that a clear color change did not occur. The applicants believe that this lack of clear color change was due to the weak reflectivity of the hologram as a result of using a transparent all dielectric system, with a transparent hologram, so that reflective diffractive peaks were not visible; only those peaks arising from the all dielectric coating were seen, as for example in FIG. 21 of Uyama.

In the instant invention, illustrated in example 5 of the specification the hologram colors are modified such that some of the strong rainbow colors normally emanating from a reflection hologram, as opposed to the transparent hologram of Uyama, are accentuated or suppressed by the Fabry Perot filter. Furthermore, the diffractive pattern is built and replicated into the Fabry Perot reflection filter allowing maximum reflection from both the diffractive and interference devices. This is illustrated in Example 5 of this specification. This color interaction is totally new for a security device and there are currently several Federal governments and holographic companies interested in the device of this invention becoming commercially available.

It would therefore be of substantial advantage to develop improved security products which provide enhanced viewing qualities in various lighting conditions, especially in diffuse lighting, and which are usable in various security applications to make counterfeiting more difficult.

SUMMARY AND OBJECTS OF THE INVENTION

It is a primary object of the invention to provide a security article having color shifting properties which increases the difficulty of counterfeiting in a variety of applications.

Another object of the invention to provide a security article with a distinctive pattern that is readily observable over a wide range of viewing angles in diffuse lighting conditions.

Another object of the invention is to provide a security article with an optical interference pattern such as a holographic pattern that has enhanced visibility and contrast to provide for viewing under diffuse lighting conditions without the need for direct specular light.

To achieve the foregoing objects and in accordance with the invention as embodied and broadly described herein, a security article is provided which includes a light transmissive substrate having a first surface and an opposing second surface, with the first surface having an optical interference pattern such as a holographic image pattern or an optical diffraction pattern thereon. A color shifting optical coating is formed on the substrate such as on the interference pattern or on the opposing second surface of the substrate, with the optical coating providing an observable color shift as the angle of incident light or viewing angle changes. Various processes can be utilized to form the security article, such as vacuum coating processes, organic coatings, lamination, laser scribing, and laser imaging.

The color shifting optical coating can be varied in different embodiments of the invention. For example, the optical coating can be a multilayer optical interference film such as a three layer optical stack of absorber-dielectric-reflector, or alternating layers of low and high index of refraction dielectric layers. In addition, the optical coating can be formed from a plurality of multilayer optical interference flakes dispersed in a polymeric medium such as a color shifting ink.

In other embodiments, various security articles are formed by laminating a prelaminate structure including a color shifting optical coating, which can optionally be laser imaged by ablation, to a substrate embossed with an optical interference pattern.

In another method of the invention, a color shifting optical coating is formed on a master shim so as to conform to the shape of an optical interference pattern on the shim. A carrier substrate layer is affixed to the optical coating and is removed along with the optical coating from the shim to produce a security article with the interference pattern replicated in the optical coating.

The security article of the invention can be affixed to a variety of objects through various attachment mechanisms, such as pressure sensitive adhesives or hot stamping processes, to provide for enhanced security measures such as anticounterfeiting. The security article can be utilized in the form of a label, a tag, a ribbon, a security thread, and the like, for application to a variety of objects such as security documents, monetary currency, credit cards, merchandise, etc.

In accordance with this invention a security article is provided comprising:

a substrate;

a diffractive grating having a grating pattern directly on the surface of the substrate or upon a coating adjacent to the substrate;

an optically variable coating directly on the diffractive grating in manner such that a layer of the optically variable coating adjacent to the diffractive grating conforms to the grating pattern and whereby the grating pattern is replicated into the optically variable coating, wherein the optically variable coating includes an absorber layer, a dielectric layer and a reflector layer for providing an observable color shift as the angle of incident light or viewing angle changes wherein the colorshift is a combination of thin film and diffractive interference effects.

These and other aspects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE INVENTION

The present invention is directed to security articles having diffractive surfaces with color shifting backgrounds that produce enhanced visual effects. The configuration of the security articles is such that a combination of optical interference patterns such as holographic or diffraction grating patterns with color shifting foils or inks decreases the possibility of counterfeiting. Furthermore, the articles of the invention allow a user to more easily view the image or diffraction effect in diffuse light without the need for direct specular light.

Generally, the configuration of the security articles of the present invention is such that the combination of a light transmissive substrate, having an interference pattern on the surface thereof, with color shifting optical coatings provides security features that make forgery or counterfeiting of an object difficult. The present invention combines the performance features of light interference effects with the diffractive effects of a diffractive surface such as a hologram. The security articles allow for ready identification by the average person while still preserving complex optical patterns, thus overcoming disadvantages of conventional holographic technology.

The various embodiments of the invention, described in further detail below, can be formed using three basic constructions. One involves substituting the aluminum reflector of a hologram or other diffractive surface with a thin film optical interference stack. This construction builds the hologram structure right into the optical interference stack. In this case, the optical coating is vacuum deposited directly onto the embossed surface. The second construction adds a thin film color shifting foil or ink to the side of a substrate opposite of the embossing. Whether foil or ink is used, the interference effect can be based on a metal-dielectric-absorber interference structure, or all-dielectric optical designs. The third approach involves laminating a color shifting optical coating structure, which can be digitally imaged by laser ablation, reflective pattern etching, or chemical etching by photolithography, to a diffractive surface such as a hologram.

Figure 1:
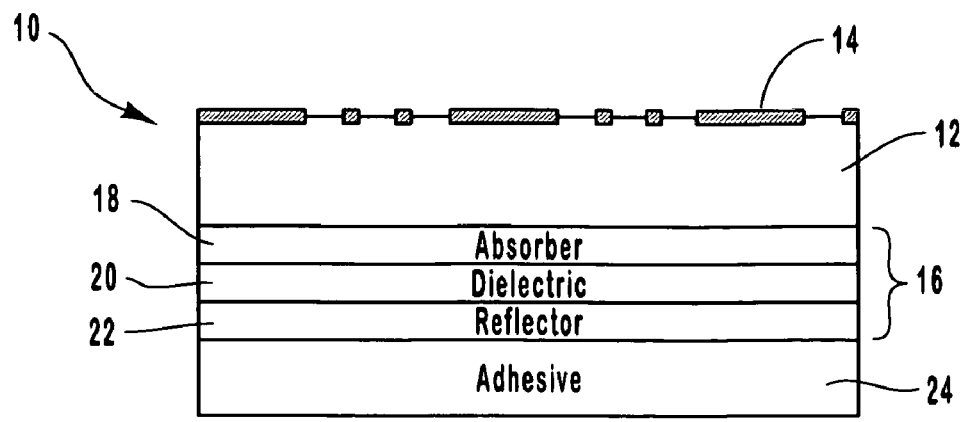
FIG. 1 is a schematic depiction of a security article according to one embodiment of the present invention.

Referring to the drawings, wherein like structures are provided with like reference designations, FIG. 1 depicts a security article 10 according to one embodiment of the present invention. The security article 10 includes a light transmissive substrate 12 having an optical interference pattern 14 such as an embossed image on an outer first surface thereof. A color shifting optical coating 16 is formed on an opposing second surface of substrate 12 and is discussed in further detail below. The combination of substrate 12 and color shifting optical coating 16 forming security article 10 provides a security feature that reduces the possibility of duplication, forgery and/or counterfeiting of an object having security article 10 thereon.

The optical interference pattern 14 formed on the outer surface of light transmissive substrate 12 can take various conventional forms including diffraction patterns such as diffraction gratings, refraction patterns, holographic patterns such as two-dimensional and three-dimensional holographic images, corner cube reflectors, Kinegram® devices (i.e., holograms with changing imagery as the angel of view is changed), Pixelgram® devices (i.e., a hologram with multiple holographic pixels arranged in a spatial orientation that generates one holographic image), zero order diffraction patterns, moiré patterns, or other light interference patterns based on microstructures having dimensions in the range from about 0.1 μm to about 10 μm, preferably about 0.1 μm to about 1 μm, and various combinations of the above such as hologram/grating images, or other like interference patterns.

The particular methods and structures that form optical interference pattern 14 are known by those skilled in the art. For example, embossing the light transmissive substrate to form an interference pattern such as a hologram thereon can be done by well known methods, such as embossing the surface of a plastic film by pressing it in contact with a heated nickel embossing shim at high pressure. Other methods include photolithography, molding of the plastic film against a patterned surface, and the like.

The Kinegram® device is a two-dimensional, computer-generated image (available from OVD Kinegram Corp. of Switzerland) in which the individual picture elements are filled with light-diffracting microstructures. These microstructures are extremely fine surface modulations with typical dimensions of less than one micrometer.

Generally, moldable thermoformable materials are used to form light transmissive substrate 12 and include, for example, plastics such as polyethylene terephthalate (PET), especially PET type G, polycarbonate, acrylics such as polyacrylates including polymethyl methacrylate (PMMA), polyacrylonitrile, polyvinyl chloride, polystyrene, cellulose diacetate and cellulose triacetate, polypropylene, polydicyclopentadiene, mixtures or copolymers thereof, and the like. In one preferred embodiment, light transmissive substrate 12 is substantially composed of a transparent material such as polycarbonate. The substrate 12 is formed to have a suitable thickness of about 3 μm to about 100 μm, and preferably a thickness of about 12 μm to about 25 μm. In addition, substrate 12 can be made of one layer or multiple layers of substrate materials. Generally, substrate 12 should have a lower melting point or glass transition temperature than the optical coating, while being transparent.

In one method, substrate 12 can be produced from a thermoplastic film that has been embossed by heat softening the surface of the film and then passing the film through embossing rollers which impart the diffraction grating or holographic image onto the softened surface. In this way, sheets of effectively unlimited length can be formed with the diffraction grating or holographic image thereon. Alternatively, the diffractive surface can be made by passing a roll of plastic film coated with an ultraviolet (UV) curable polymer, such as PMMA, through a set of UV transparent rollers whereby the rollers set a diffractive surface into the UV curable polymer and the polymer is cured by a UV light that passes through the UV transparent rollers.

As shown in FIG. 1, the color shifting optical coating 16 is a multilayer optical interference stack or foil that includes an absorber layer 18, a dielectric layer 20, and a reflector layer 22. The absorber layer 18 can be deposited on light transmissive substrate 12 by a conventional deposition process such as physical vapor deposition (PVD), sputtering, or the like. The absorber layer 18 is formed to have a suitable thickness of about 30–300 Å Angstroms (Å), and preferably a thickness of about 50–100 Å.

The absorber layer 18 can be composed of a semi-opaque material such as a grey metal, including metals such as chromium, nickel, titanium, vanadium, cobalt, and palladium, as well as other metals such as iron, tungsten, molybdenum, niobium, aluminum, and the like. Various combinations and alloys of the above metals may also be utilized, such as Inconel (Ni—Cr—Fe). Other absorber materials may also be employed in absorber layer 18 including metal compounds such as metal sub-oxides, metal sulfides, metal nitrides, metal carbides, metal phosphides, metal selenides, metal silicides, and combinations thereof, as well as carbon, germanium, ferric oxide, metals mixed in a dielectric matrix, and the like.

The dielectric layer 20 can be formed on absorber layer 18 by a conventional deposition process such as PVD, chemical vapor deposition (CVD), plasma enhanced chemical vapor deposition (PECVD), reactive DC sputtering, RF sputtering, or the like. The dielectric layer 20 is formed to have an effective optical thickness for imparting color shifting properties to security article 10. The optical thickness is a well known optical parameter defined as the product $\eta d$, where $\eta$ is the refractive index of the layer and d is the physical thickness of the layer. Typically, the optical thickness of a layer is expressed in terms of a quarter wave optical thickness (QWOT) that is equal to $4\eta d/\lambda$, where $\lambda$ is the wavelength at which a QWOT condition occurs. The optical thickness of dielectric layer 20 can range from about 2 QWOT at a design wavelength of about 400 nm to about 9 QWOT at a design wavelength of about 700 nm, and preferably 2–6 QWOT at 400–700 nm, depending upon the color shift desired. Suitable materials for dielectric layer 20 include those having a "high" index of refraction, defined herein as greater than about 1.65, as well as those have a "low" index of refraction, which is defined herein as about 1.65 or less.

Examples of suitable high refractive index materials for dielectric layer 20 include zinc sulfide (ZnS), zinc oxide (ZnO), zirconium oxide ($ZrO_2$), titanium dioxide ($TiO_2$), carbon (C), indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II) diiron (III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof, and the like.

Suitable low refractive index materials for dielectric layer 20 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The reflector layer 22 can be formed on dielectric layer 20 by a conventional deposition process such as PVD, sputtering, or the like. The reflector layer 22 is formed to have a suitable thickness of about 300–1000 Å, and preferably a thickness of about 500–1000 Å. The reflector layer 22 is preferably composed of an opaque, highly reflective metal such as aluminum, silver, copper, gold, platinum, niobium, tin, combinations and alloys thereof, and the like, depending on the color effects desired. It should be appreciated that semi-opaque metals such as grey metals become opaque at approximately 350–400 Å. Thus, metals such as chromium, nickel, titanium, vanadium, cobalt, and palladium, or cobalt-nickel alloys, could also be used at an appropriate thickness for reflector layer 22.

In addition, reflector layer 22 can be composed of a magnetic material such as a cobalt-nickel alloy, or can be formed of a semitransparent material, to provide for machine readability for security verification. For example, machine readable information may be placed on a backing underlying the optical coating, such as personal identification numbers (PINS), account information, business identification of source, warranty information, or the like. In an alternative embodiment, reflector layer 22 can be segmented to allow for partial viewing of underlying information either visually or through the use of various optical, electronic, magnetic, or other detector devices. This allows for detection of information below optical coating 16, except in those locations where reflector segments are located, thereby enhancing the difficulty in producing counterfeits. Additionally, since the reflector layer is segmented in a controlled manner, the specific information prevented from being read is controlled, providing enhanced protection from forgery or alteration.

As shown in FIG. 1, security article 10 can also optionally include an adhesive layer 24 such as a pressure sensitive adhesive on reflector layer 22. The adhesive layer 24 allows security article 10 to be easily attached to a variety of objects such as credit cards, certificates of authenticity, bank cards, banknotes, visas, passports, driver licenses, immigration cards, and identification cards, as well as containers and other three-dimensional objects. The adhesive layer 24 can be composed of a variety of adhesive materials such as acrylic-based polymers, and polymers based on ethylene vinyl acetate, polyamides, urethane, polyisobutylene, polybutadiene, plasticized rubbers, combinations thereof, and the like. Alternatively, a hot stamping process, examples of which are discussed in further detail below, can be utilized to attach security article 10 to an object. By using an absorber/dielectric/reflector design for color shifting optical coating 16, such as shown in FIG. 1, high chroma variable color effects are achieved that are noticeable to the human eye. Thus, an object having security article 10 applied thereto will change color depending upon variations in the viewing angle or the angle of the object relative to the viewing eye, as well as variations in angles of incident light. As a result, the variation in colors with viewing angle increases the difficulty to forge or counterfeit security article 10. Furthermore, the thin film interference color shifting coating changes the diffractive colors, either suppressing, modifying or enhancing certain colors depending on the inherent color shifts of the diffractive and thin film structures. By way of example, the color-shifts that can be achieved utilizing color shifting optical coating 16 in accordance with the present invention include, but are not limited to, gold-to-green, green-to-magenta, blue-to-red, green-to-silver, magenta-to-silver, magenta-to-gold, etc.

The color shifting properties of optical coating 16 can be controlled through proper design of the layers thereof. Desired effects can be achieved through the variation of parameters such as thickness of the layers and the index of refraction of each layer. The changes in perceived color which occur for different viewing angles or angles of incident light are a result of a combination of selective absorption of the materials comprising the layers and wavelength dependent interference effects. The interference effects, which arise from the superposition of the light waves that have undergone multiple reflections and transmissions within the multilayered structure, are responsible for the shifts in perceived color with different angles.

Figure 2:
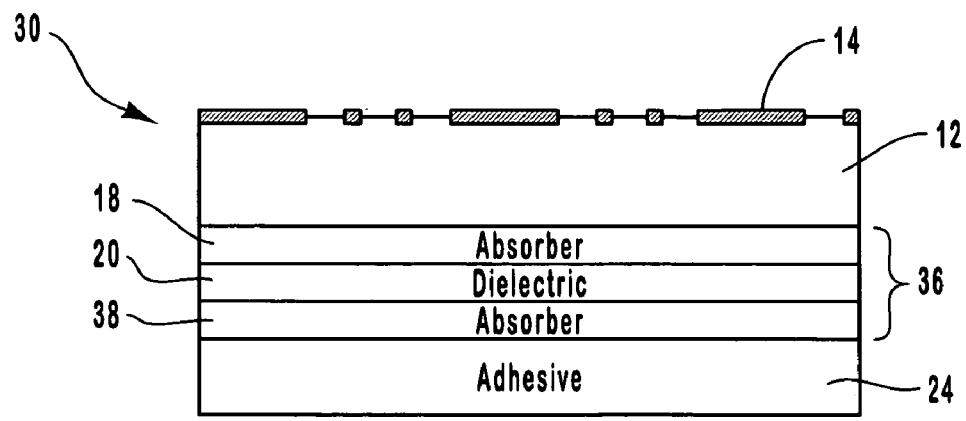
FIG. 2 is a schematic depiction of a security article according to another embodiment of the present invention.

FIG. 2 depicts a security article 30 according to another embodiment of the present invention. The security article 30 includes elements similar to those discussed above with respect to security article 10, including a light transmissive substrate 12 formed with an optical interference pattern 14 on an outer first surface thereof, and a color shifting optical coating 16 formed on an opposing second surface of substrate 12. The optical coating 36 is a multilayer film that includes an absorber layer 18, a dielectric layer 20 thereon, and another absorber layer 38, but does not include a reflector layer. This multilayer film configuration is disclosed in U.S. Pat. No. 5,278,590 to Phillips et al., which is incorporated by reference herein. Such a film structure allows optical coating 36 to be transparent to light incident upon the surface thereof, thereby providing for visual verification or machine readability of information below optical coating 36 on a carrier substrate (not shown). An adhesive layer 24 such as a pressure sensitive adhesive can be optionally formed on absorber layer 38 if desired to allow attachment of security article 30 to an appropriate surface of an object.

Figure 3:
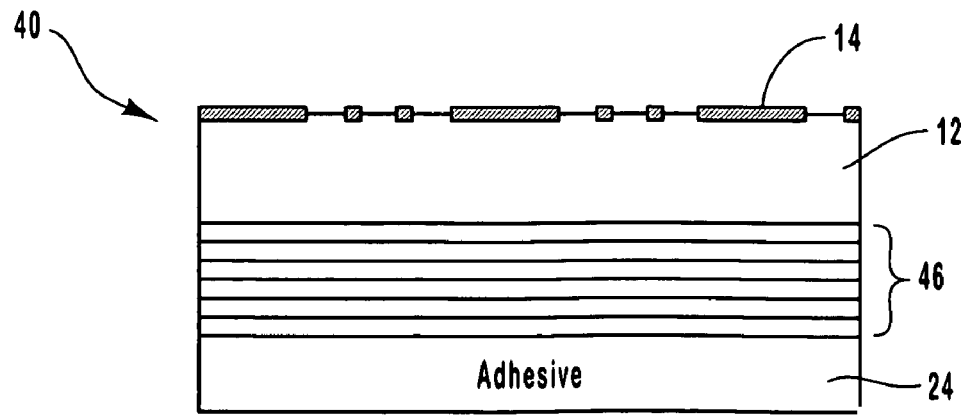
FIG. 3 is a schematic depiction of a security article according to a further embodiment of the present invention.

FIG. 3 depicts a security article 40 according to a further embodiment of the present invention. The security article 40 includes elements similar to those discussed above with respect to security article 10, including a light transmissive substrate 12 formed with an optical interference pattern 14 on an outer first surface thereof, and a color shifting optical coating 46 formed on an opposing second surface of substrate 12. The optical coating 46 however, is a multilayer optical stack that includes all dielectric layers. Suitable optical stacks for optical coating 46 that include all dielectric layers are disclosed in U.S. Pat. Nos. 5,135,812 and 5,084,351 to Phillips et al., the disclosures of which are incorporated herein by reference. Generally, optical coating 46 includes alternating layers of low and high index of refraction dielectric layers which can be composed of various materials such as those discussed above for dielectric layer 20. The all dielectric stack of optical coating 46 enables security article 40 to be transparent to light incident upon the surface thereof. An adhesive layer 24 such as a pressure sensitive adhesive can be formed on optical coating 46 if desired.

Figure 4:
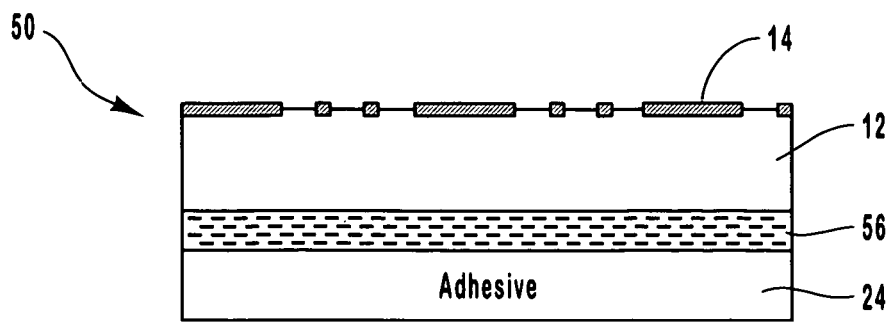
FIG. 4 is a schematic depiction of a security article according to another embodiment of the present invention.

FIG. 4 depicts a security article 50 according to a further embodiment of the present invention. The security article 50 includes elements similar to those discussed above with respect to security article 10, including a light transmissive substrate 12 formed with an optical interference pattern 14 on an outer first surface thereof, and a color shifting optical coating 56 applied to an opposing second surface of substrate 12. The color shifting optical coating 56 is formed from a layer of color shifting ink or paint that includes a polymeric medium interspersed with a plurality of optical interference flakes having color shifting properties.

The color shifting flakes of optical coating 56 are formed from a multilayer thin film structure that includes the same basic layers as described above for the optical coating 16 of security article 10. These include an absorber layer, a dielectric layer, and optionally a reflector layer, all of which can be composed of the same materials discussed above in relation to the layers of optical coating 16. The flakes can be formed to have a symmetrical multilayer thin film structure, such as absorber/dielectric/reflector/dielectric/absorber, or absorber/dielectric/absorber. Alternatively, the flakes can have a nonsymmetrical structure, such as absorber/dielectric/reflector. The flakes are formed so that a dimension on any surface thereof ranges from about 2 to about 200 microns.

Typically, the multilayer thin film structure is formed on a flexible web material with a release layer thereon. The various layers are deposited on the web by methods well known in the art of forming thin coating structures, such as PVD, sputtering, or the like. The multilayer thin film structure is then removed from the web material as thin film color shifting flakes, which can be added to a polymeric medium such as various pigment vehicles for use as an ink or paint. In addition to the color shifting flakes, additives can be added to the inks or paints to obtain desired color shifting results. These additives include lamellar pigments such as aluminum flakes, graphite, mica flakes, and the like, as well as non-lamellar pigments such as aluminum powder, carbon black, and other colorants such as organic and inorganic pigments, and colored dyes.

Suitable embodiments of the flake structure are disclosed in a copending application Ser. No. 09/198,733, filed on Nov. 24, 1998, now U.S. Pat. No. 6,157,489, and entitled "Color Shifting Thin Film Pigments," which is incorporated herein by reference. Other suitable embodiments of color shifting or optically variable flakes which can be used in paints or inks for application in the present invention are described in U.S. Pat. Nos. 5,135,812, 5,171,363, 5,278,590, 5,084,351, and 4,838,648, the disclosures of which are incorporated by reference herein.

The color shifting ink or paint utilized to form optical coating 56 on security article 50 can be applied by conventional coating devices and methods known to those skilled in the art. These include, for example, various printing methods such as silk screen, intaglio, gravure or flexographic methods, and the like. Alternatively, optical coating 56 can be formed on security article 50 by coextruding a polymeric material containing color shifting flakes, with the plastic material used to form substrate 12 having interference pattern 14.

An adhesive layer 24 such as a pressure sensitive adhesive can optionally be formed on optical coating 56 as desired to allow attachment of security article 50 to an appropriate surface of an object.

Figure 5:
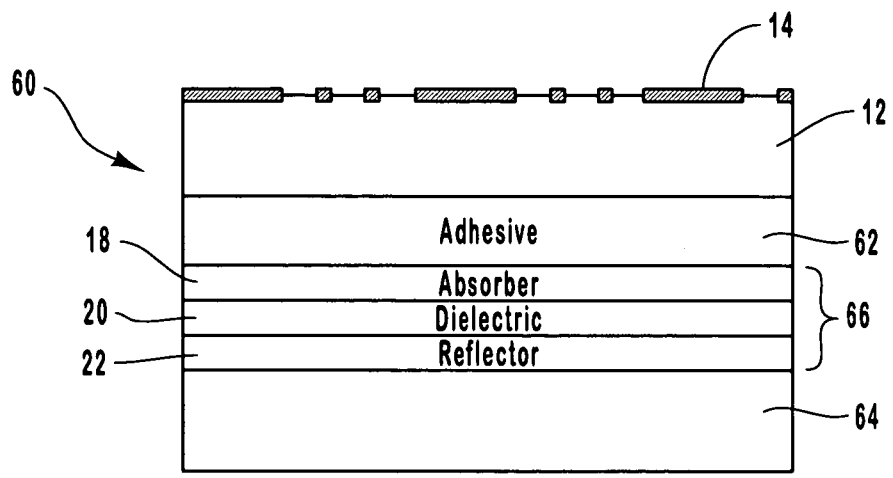
FIG. 5 is a schematic depiction of a security article according to yet another embodiment of the present invention.

In another embodiment of the invention shown in FIG. 5, a security article 60 includes elements similar to those discussed above with respect to security article 10, including a light transmissive substrate 12 formed with an optical interference pattern 14 on an outer first surface thereof. A color shifting optical coating 66 is provided in the form of a foil that is laminated to a second opposing surface of substrate 12 by way of an adhesive layer 62. The laminating adhesive may be composed of a pressure sensitive adhesive, polyurethanes, acrylates, natural latex, or combinations thereof. The optical coating 16 includes an absorber layer 18, a dielectric layer 20 thereon, and a reflector layer 22 on dielectric layer 20. The optical coating 16 is formed on a carrier sheet 64 prior to being laminated to substrate 12. For example, the optical coating 16 can be deposited in a vacuum roll coater onto a transparent plastic carrier sheet such as PET prior to lamination.

In alternative embodiments of security article 60, the optical coating can take the form of a multilayer structure having absorber and dielectric layers with no reflector layer such as in optical coating 36 of security article 30, or can take the form of an all dielectric optical stack such as in optical coating 46 of security article 40. In addition, the optical coating of security article 60 can take the form of a color shifting ink or paint layer such as in optical coating 56 of security article 50.

Figure 6:
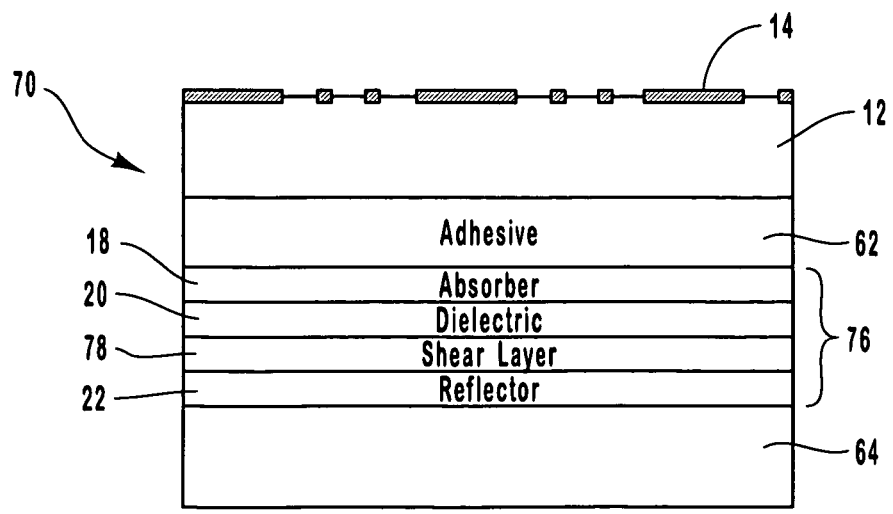
FIG. 6 is a schematic depiction of a security article according to a further embodiment of the present invention.

FIG. 6 depicts a security article 70 according to a further embodiment of the present invention. The security article 70 includes elements similar to those discussed above with respect to security article 60, including a light transmissive substrate 12 formed with an optical interference pattern 14 on an outer first surface thereof. A color shifting optical coating 76 is provided in the form of a foil that is laminated to a second opposing surface of substrate 12 by way of an adhesive layer 62. The optical coating 76 includes an absorber layer 18, a dielectric layer 20, and a reflector layer 22, which are formed on a carrier sheet 64 prior to being laminated to substrate 12. The optical coating 76 further includes an essentially optically inactive interlayer 78 that is shear sensitive. The interlayer 78 is formed between dielectric layer 20 and reflector layer 22 by a conventional coating process and is composed of a very thin layer (e.g., about 50–200 Å) of vapor deposited material such as polytetrafluoroethylene, fluorinated ethylene propylene (FEP), silicone, carbon, combinations thereof, or the like. The interlayer 78 makes it impossible to peel off security article 70 in an undamaged state once it has been applied to an object.

Figure 7:
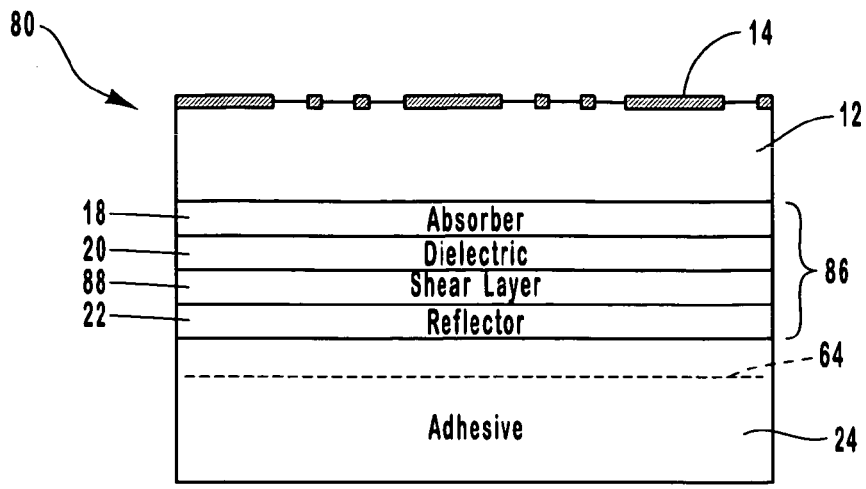
FIG. 7 is a schematic depiction of a security according to another embodiment of the present invention.

It should be understood that the shear interlayer as described for security article 70 can be utilized if desired in the other above described embodiments that utilize an optical coating comprising a multilayer foil. For example, FIG. 7 depicts a security article 80 that includes essentially the same elements as those discussed above with respect to security article 10, including a light transmissive substrate 12 having an optical interference pattern 14, and a color shifting optical coating 86 having an absorber layer 18, a dielectric layer 20, and a reflector layer 22. The optical coating further includes an essentially optically inactive interlayer 88 that is formed between dielectric layer 20 and reflector layer 22. An adhesive layer 24 such as a pressure sensitive adhesive can optionally be formed on reflector layer 22, or on an optional carrier sheet 64, such as a plastic sheet, to allow attachment of security article 80 to an appropriate surface of an object. In the latter case, the absorber layer would be adhesively bonded to light transmissive substrate 12 since carrier sheet 64 would carry the layers 18, 20, 88, and 22.

Figure 8A:
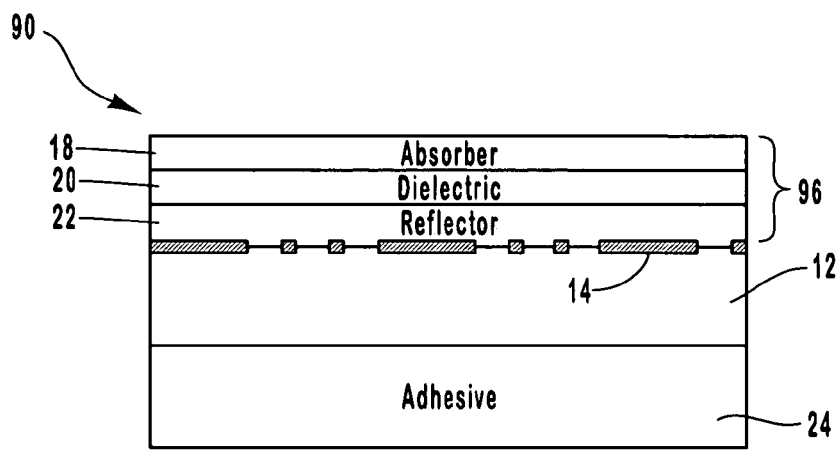
FIG. 8A is a schematic depiction of a security article according to a further embodiment of the present invention.

FIG. 8A depicts a security article 90 according to another embodiment of the present invention in which the embossed surface of a substrate carries the optical coating. The security article 90 includes elements similar to those discussed above with respect to security article 10, including a light transmissive substrate 12 having an optical interference pattern 14 embossed on a surface thereof, and a color shifting optical coating 96 that is a multilayer film optical stack. The optical coating 96 is formed, however, on the same side as the interference pattern on substrate 12 by conventional vacuum deposition processes. The optical coating 96 includes an absorber layer 18, a dielectric layer 20 under absorber layer 18, and a reflector layer 22 under dielectric layer 20. Alternatively, the order of layer deposition can be reversed, i.e., the absorber layer may be deposited first onto the optical interference pattern, followed by the dielectric layer, and finally the reflective layer. In this configuration, one can view the interference pattern such as a modified hologram by viewing the security article through light transmissive substrate 12.

Figure 8B:
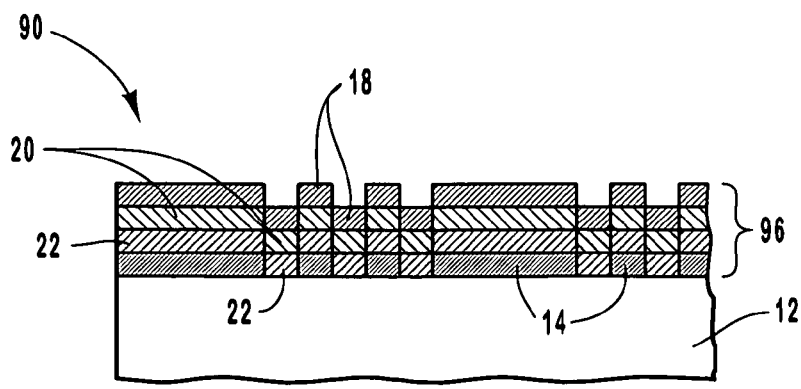
FIG. 8B is an enlarged sectional view of the security article of FIG. 8A.

Each of these layers of optical coating 96 formed on substrate 12 preferably conforms to the shape of the underlying interference pattern such as a holographic image, resulting in the holographic structure being present at the outer surface of optical coating 96. This is shown more clearly in the enlarged sectional view of security article 90 in FIG. 8B. The vacuum processing utilized in forming optical coating 96 or other multilayer coating will maintain the holographic structure through the growing film so that the holographic image is retained at the outer surface of optical coating 96. This is preferably accomplished by a directed beam of vapor essentially normal to the coated surface. Such processing tends to replicate the initial structure throughout the optical stack to the outer surface.

An adhesive layer 24 such as a pressure sensitive adhesive can be optionally formed on a surface of substrate 12 opposite from optical coating 96 to allow attachment of security article 90 to an appropriate surface of an object.

It should be understood that in alternative embodiments of security article 90, optical coating 96 can take the form of a multilayer structure having absorber and dielectric layers with no reflector layer such as in optical coating 36 of security article 30, or can take the form of an all-dielectric optical stack such as in optical coating 46 of security article 40.

Figure 9:
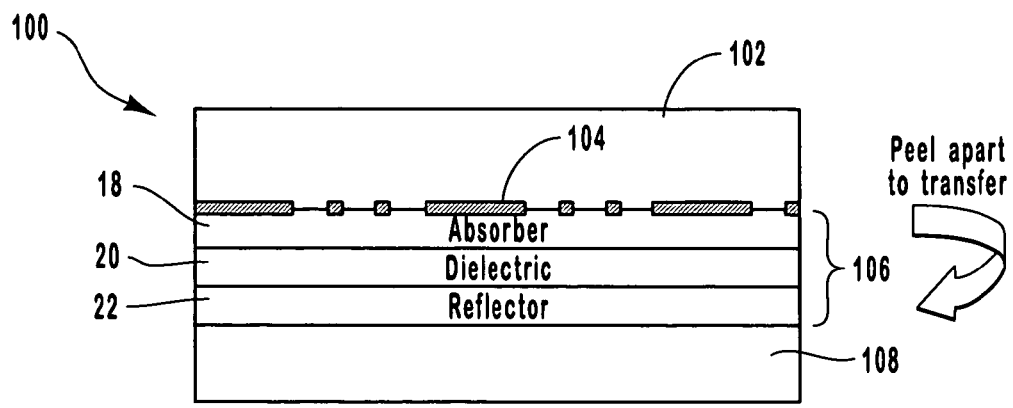
FIG. 9 is a schematic depiction of a security article according to another embodiment of the present invention.

FIG. 9 depicts a security article 100 according to another embodiment of the present invention which is formed from a master shim 102 used to replicate an interference structure such as a hologram in an optical stack. The master shim 102 is composed of a metallic material such as nickel, tin, chromium, or combinations thereof, and has a holographic or diffractive pattern 104 formed thereon. An optical coating 106 is formed on pattern 104 by conventional vacuum deposition processes such as physical vapor deposition. The optical coating 106 includes a release layer (not shown) directly deposited onto pattern 104, an absorber layer 18, a dielectric layer 20 on absorber layer 18, and a reflector layer 22 on dielectric layer 20. The release layer may be composed of a material such as gold, silicone, or a low surface energy material such as FEP. The dielectric layer is preferably a low index material such as $MgF_2$ or $SiO_2$ because of the stress benefits provided. Each of these layers of optical coating 106 is formed on master shim 102 so as to conform to the shape of the underlying holographic or diffractive pattern 104. A receiver sheet 108 such as a plastic sheet with an adhesive (not shown) is attached to reflector layer 22. The optical coating 106 can then be stripped away from master shim 102 onto receiver sheet 108 for attachment onto an object, leaving the holographic or diffractive pattern replicated in optical coating 106.

In alternative embodiments of security article 100, optical coating 106 can take the form of a multilayer structure having absorber and dielectric layers with no reflector layer such as in optical coating 36 of security article 30, or can take the form of an all-dielectric optical stack such as in optical coating 46 of security article 40.

In the following embodiments, various security articles are formed by laminating laser imaged optical coating structures to embossed substrates. Lamination provides the advantage of being cost effective and secure since the two expensive security components (i.e., the color shifting film and hologram) are kept separate until laminated together. The laminated articles can include either a color shifting foil or ink, which can be used as the background underneath a holographic image, with the holographic image capable of being seen only at selected angles. The hologram is thus seen superimposed on a color shifting background that also has an associated image.

Figure 10A:
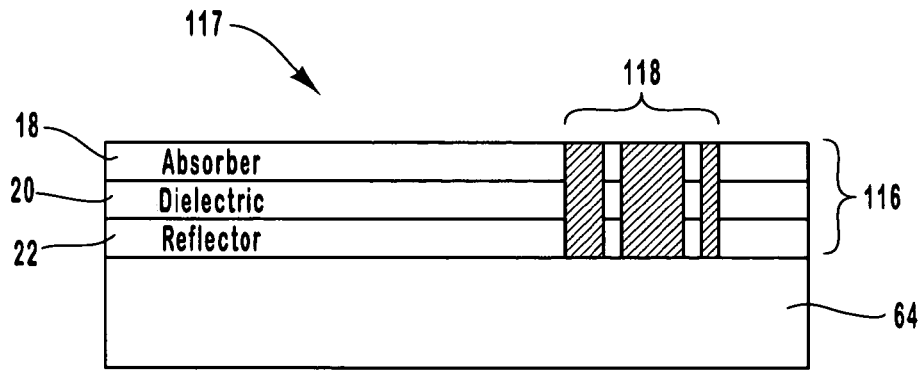
FIG. 10A is a schematic depiction of a prelaminate structure used to form a security article according to an additional embodiment of the present invention.
Figure 10B:
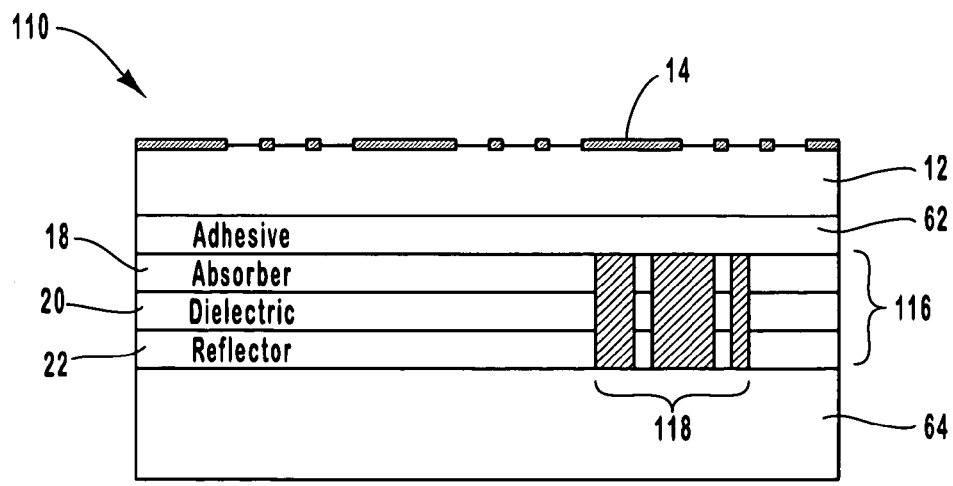
FIG. 10B is a schematic depiction of a security article formed from the prelaminate structure of FIG. 10A.

In the embodiment illustrated in FIGS. 10A and 10B, a security article 110 is provided with laser ablated images formed in a color shifting optical coating 116. As shown in FIG. 10A, optical coating 116 is formed on a carrier sheet 64 such as transparent PET by conventional coating processes to form a prelaminate structure 117. The optical coating 116 is formed by depositing a reflector layer 22 on carrier sheet 64, followed by deposition of a dielectric layer 20 and an absorber layer 18. A laser ablated image 118 is then formed in optical coating 116 on prelaminate structure 117 by a conventional laser imaging system The laser ablated image 118 can take the form of digital images (e.g., pictures of people, faces), bar codes, covert (i.e., microscopic) data and information, or combinations thereof. The laser imaging can be accomplished by using a semiconductor diode laser system such as those available from Presstek, Inc. and disclosed in U.S. Pat. Nos. 5,339,737 and Re. 35,512, the disclosures of which are incorporated by reference herein. Alternatively, reflective pattern etching, or chemical etching by photolithography can be utilized to form various images in the optical coating.

The prelaminate structure 117 with laser ablated image 118 is then laminated to a a light transmissive substrate 12 having an optical interference pattern 14, such as a diffractive or holographic pattern on a surface thereof, as shown in FIG. 10B. The prelaminate structure 117 is laminated to substrate 12 through adhesive layer 62 at a surface opposite from interference pattern 14 to form the completed security article 110. Alternatively, prelaminate structure 117 can be laminated on the embossed surface of substrate 12. In the latter case, the device is viewed through transmissive substrate 12. In such a case, a high index transparent layer must be in place on the embossed surface so that index matching between the adhesive and embossed surface does not occur. Suitable examples of such a high index transparent layer include $TiO_2$ or ZnS.

It should be understood that prelaminate structure 117 can be used as a final product if desired without subsequent lamination to an embossed substrate. In this case, prelaminate structure 117 could be directly attached to an object by use of an adhesive or other attachment mechanism. The prelaminate structure can also be prepared by directly laser ablating a suitable optically variable layer which has been directly deposited onto a holographic or diffractive substrate.

Figure 11:
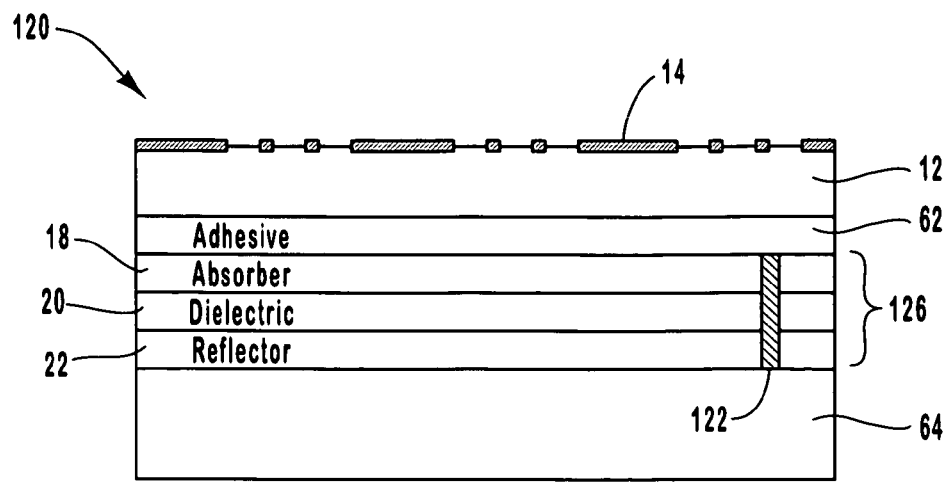
FIG. 11 is a schematic depiction of a security article according to another embodiment of the present invention.

FIG. 11 shows a security article 120 according to another embodiment of the invention which includes elements similar to those discussed above with respect to security article 110, including a light transmissive substrate 12 having an optical interference pattern 14 such as a holographic or diffractive pattern, and a color shifting optical coating 126 that is laminated to substrate 12 by an adhesive layer 62. The optical coating 126 includes an absorber layer 18, a dielectric layer 20, and a reflector layer 22. The optical coating 126 is deposited on a carrier sheet 64 to form a prelaminate structure prior to being laminated to substrate 12. The prelaminate structure is subjected to a laser imaging process such as described above for security article 110 in order to form a laser scribed number 122 such as a serial number for use in serialized labels.

Figure 12:
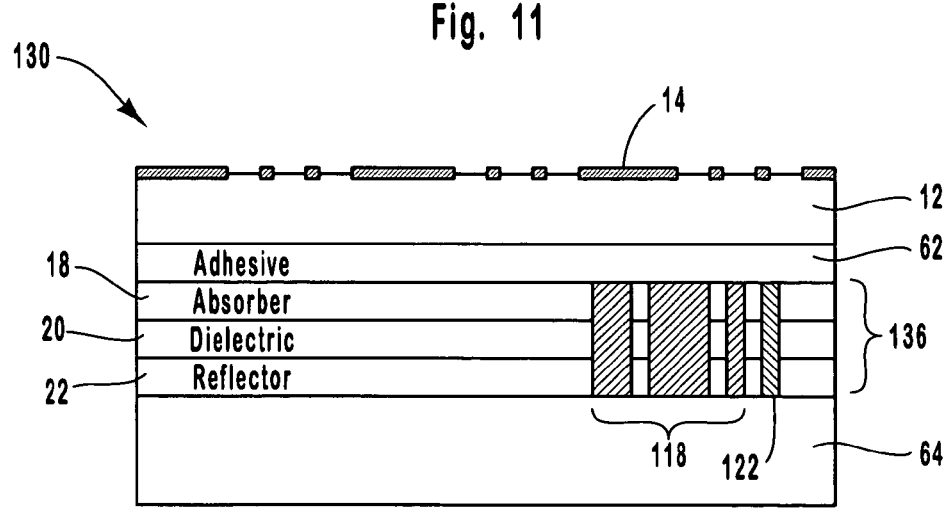
FIG. 12 is a schematic depiction of a security article according to an alternative embodiment of the present invention.

FIG. 12 depicts a security article 130 according to a further embodiment of the invention which includes elements similar to those discussed above with respect to security articles 110 and 120, including a light transmissive substrate 12 formed with a holographic or diffractive pattern, and a color shifting optical coating 136 that is laminated to substrate 12 by an adhesive layer 62. The optical coating 136 includes an absorber layer 18, a dielectric layer 20, and a reflector layer 22 as described above. The optical coating 136 is deposited on a carrier sheet 64 to form a prelaminate structure prior to being laminated to substrate 12. The prelaminate structure is subjected to a laser imaging process such as described above for security articles 110 and 120 in order to form both a laser ablated image 118 as well as a laser scribed number 122, thereby combining the features of security articles 110 and 120.

Figure 13:
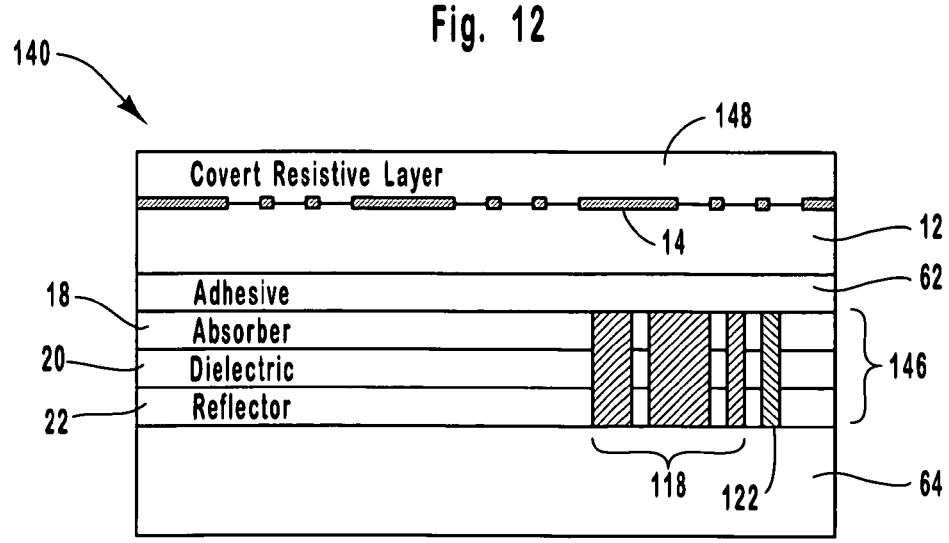
FIG. 13 is a schematic depiction of a security article according to an additional embodiment of the present invention.

In an additional embodiment of the invention illustrated in FIG. 13, a security article 140 includes elements similar to those discussed above with respect to security articles 130, including a light transmissive substrate 12 formed with an optical interference pattern 14, and a color shifting optical coating 146 that is laminated to a substrate 12 by way of an adhesive layer 62. The optical coating 146 includes an absorber layer 18, a dielectric layer 20, and a reflector layer 22 as described above, with optical coating 146 being deposited on a carrier sheet 64 to form a prelaminate structure prior to being laminated to substrate 12. The prelaminate structure is subjected to a laser imaging process such as described above for security article 130 in order to form both a laser ablated image 118 as well as a laser scribed number 122. In addition, a covert resistive layer 148 is formed on substrate 12 over interference pattern 14. The covert resistive layer 148 is composed of a transparent conductive material such as indium tin oxide (ITO), indium oxide, cadmium tin oxide, combinations thereof, and the like, and provides enhanced features to security article 140 such as a defined electrical resistance. Such covert resistive layers are described in U.S. patent application Ser. No. 09/094,005, filed Jun. 9, 1998, now U.S. Pat. No. 6,031,457, the disclosure of which is incorporated herein by reference. The covert resistive layer can be applied to other embodiments of the invention if desired.

Figure 14:
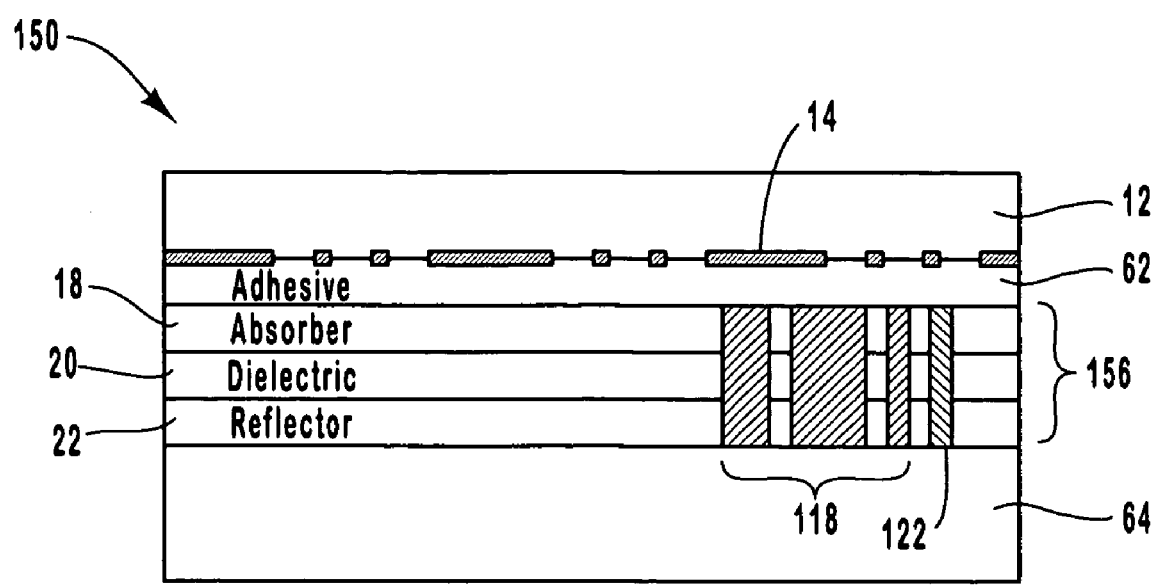
FIG. 14 is a schematic depiction of a security article according to another embodiment of the present invention.

It should be understood that the above embodiments depicted in FIGS. 10–13 could alternatively be laminated obversely such that the embossed surface with a high index transparent dielectric layer is adjacent to the laminating adhesive and optical coating. For example, FIG. 14 depicts a security article 150 which includes essentially the same elements as security article 130, including a light transmissive substrate 12 with an optical interference pattern 14, and a color shifting optical coating 156 that is laminated to substrate 12 by way of an adhesive layer 62. The optical coating 156 includes an absorber layer 18, a dielectric layer 20, and a reflector layer 22. The optical coating 156 is deposited on a carrier sheet 64 to form a prelaminate structure prior to being laminated to substrate 12. The prelaminate structure is subjected to a laser imaging process to form both a laser ablated image 118 as well as a laser scribed number 122. As shown in FIG. 14, the optical coating 156 is laminated to substrate 12 so as to be adjacent to optical interference pattern 14 such as a holographic or diffractive pattern.

In various alternative embodiments of the security articles depicted in FIGS. 10–14, the optical coating can take the form of a multilayer structure having absorber and dielectric layers with no reflector layer such as in optical coating 36 of security article 30, or can take the form of an all-dielectric optical stack such as in optical coating 46 of security article 40. In addition, the optical coating of these security articles can take the form of a color shifting ink or paint layer such as in optical coating 56 of security article 50. Such alternative optical coatings would be formed directly on carrier sheet 64 prior to laser imaging and subsequent lamination.

It should be understood that the color shifting optical coatings deposited directly on embossed substrates, such as shown in the embodiments of FIGS. 1–4 and 7–9, can also be imaged if desired, such as by laser ablation as discussed above.

Figure 15:
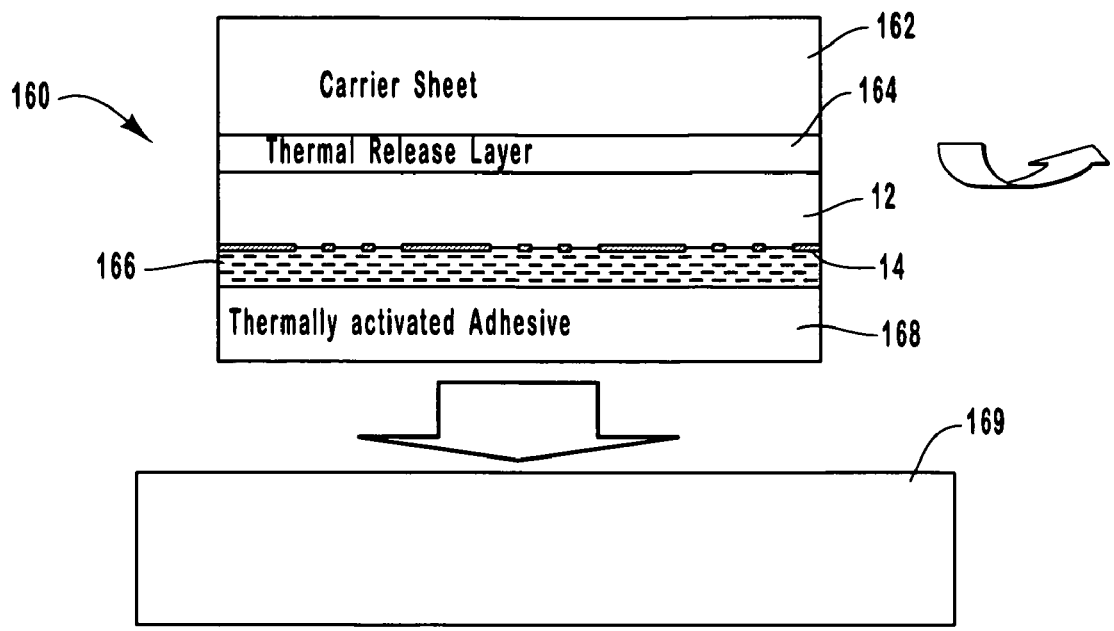
FIG. 15 is a schematic depiction of a hot stamping process used to form one embodiment of a security article according to the invention.

The security articles of the invention can be transferred and attached to various objects by a variety of attachment processes. One preferred process is hot stamping, which is shown schematically in FIGS. 15 and 16. A hot stamp structure 160 according to one embodiment is illustrated in FIG. 15 and includes a carrier sheet 162 having a thermal release layer 164 on one surface thereof. An embossed substrate 12 having an interference pattern 14 plus a high index transparent layer (not shown) on interference pattern 14 is attached to release layer 164 so that the release layer is on the side opposite of the embossing. A color shifting optical coating 166 which has been applied to substrate 12 as a solution coating of ink is interposed between substrate 12 and a thermally activated adhesive layer 168.

Generally, carrier sheet 162 can be composed of various materials such as plastics with various thicknesses which are known by those skilled in the art. For example, when carrier sheet 162 is formed of PET, the thickness preferably ranges from about 10 μm to about 75 μm. Other materials and thickness ranges are applicable in light of the teachings contained herein. Furthermore, carrier sheet 162 can be part of various manufacturing belts or other processing structures that assist in transferring the security article to a desired object.

The release layer 164 is composed of a suitable material to allow substrate 12 to be removed from carrier sheet 162 during the hot stamping process. The release layer 164 may be a polymeric material such as polyvinyl chloride, polystyrene, chlorinated rubber, acrylonitrile-butadiene-styrene (ABS) copolymer, nitrocellulose, methyl methacrylate, acrylic copolymers, fatty acids, waxes, gums, gels, mixtures thereof, and the like. The release layer 164 can have a thickness of about 1 μm to about 25 μm.

The thermally activated adhesive layer 168 can be composed of various adhesive materials such as acrylic-based polymers, ethylene vinyl acetate, polyamides, combinations thereof, and the like. The adhesive layer 168 can have a thickness of about 2 μm to about 20 μm.

During the hot stamping process, carrier sheet 162 is removed by way of release layer 164 from substrate 12 after hot stamp structure 160 has been pressed onto a surface of an object 169 to be hot stamped, with the security article composed of substrate 12 and optical coating 166 being bonded to object 169 by way of thermally activated adhesive layer 168. The object 169 may be composed of various materials such as plastics, polyester, leathers, metals, glass, wood, paper, cloth, and the like, e.g., any material surface that requires a security device. The bonding of adhesive layer 168 against the surface of object 169 occurs as a heated metal stamp (not shown), having a distinct shape or image, comes into contact with object 169 which is heated to a temperature to provide a bond between object 169 and adhesive layer 168. The heated metal stamp simultaneously forces adhesive layer 168 against object 169 while heating adhesive layer 168 to a suitable temperature for bonding to object 169. Furthermore, the heated metal stamp softens release layer 164, thereby aiding in the removal of carrier sheet 162 from substrate 12 in the areas of the stamp image to reveal the security article attached to object 169. Once the security article has been released from carrier sheet 162, the carrier sheet is discarded. When the security article has been attached to object 169, the image produced by the security article is viewed from substrate 12 toward optical coating 166.

Figure 16:
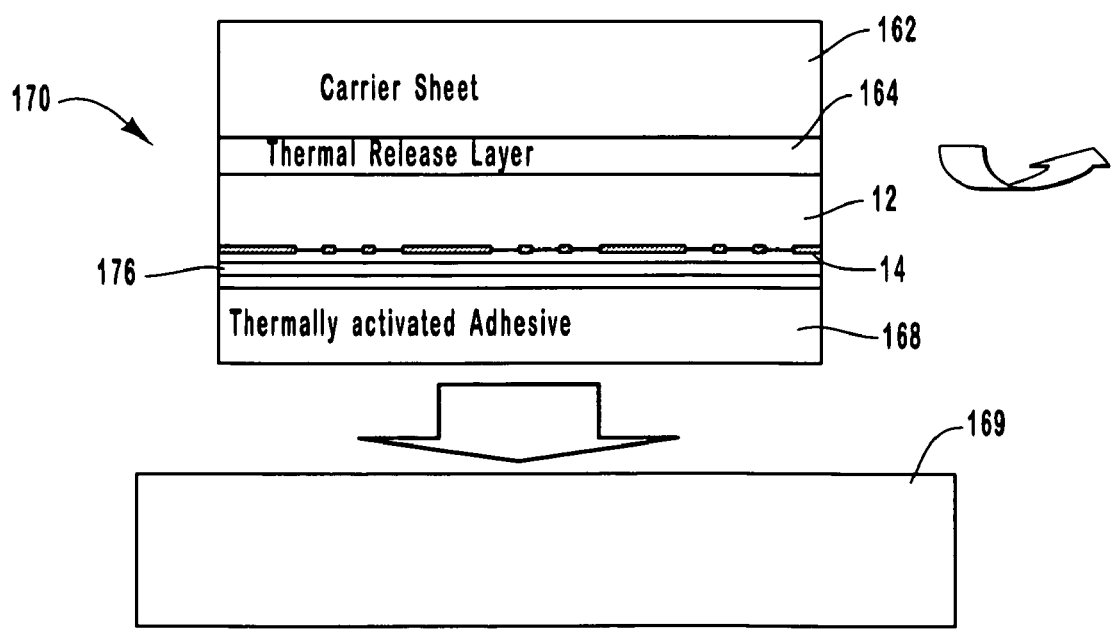
FIG. 16 is a schematic depiction of a hot stamping process used to form another embodiment of a security article according to the invention.

A hot stamp structure 170 according to another embodiment is illustrated in FIG. 16 and includes essentially the same elements as hot stamp structure 160 discussed above. These include a carrier sheet 162 having a thermal release layer 164 on one surface thereof, and an embossed substrate 12 having an interference pattern 14, with substrate 12 attached to release layer 164. A color shifting multilayer optical coating 176 which has been applied to substrate 12 as a direct vacuum coating is interposed between substrate 12 and a thermally activated adhesive layer 168.

The hot stamping process for hot stamp structure 170 is the same as that described above for hot stamp structure 160. The carrier sheet 162 is removed by way of release layer 164 from substrate 12 after hot stamp structure 170 has been pressed onto a surface of an object 169, with the security article composed of substrate 12 and optical coating 176 being bonded to object 169 by adhesive layer 168.

It should be understood that various of the other embodiments of the security article of the invention described previously can be adapted for a hot stamping process.

Alternatively, a cold transfer process using a UV activated adhesive can be utilized to attach the security articles of the invention to various objects. Such a process is described in a paper by I. M. Boswarva et al., *Roll Coater System for the Production of Optically Variable Devices (OVD's) for Security Applications*, Proceedings, 33rd Annual Technical Conference, Society of Vacuum Coaters, pp. 103–109 (1990), the disclosure of which is incorporated by reference herein.

The various security articles as described above can be used in a variety of applications to provide for enhanced security measures such as anticounterfeiting. The security articles can be utilized in the form of a label, tag, ribbon, security thread, tape, and the like, for application in a variety of objects such as security documents, security labels, financial transaction cards, monetary currency, credit cards, merchandise packaging, license cards, negotiable notes, stock certificates, bonds such as bank or government bonds, paper, plastic, or glass products, or other similar objects. Preferred applications for the security articles of the invention are in the following areas; 1) rigid substrate security products, such as payment cards, "smart cards," and identification cards; 2) laminated products, including driving licenses, security passes, border crossing cards, and passports; and 3) "one trip" security items such as tax stamps, banderoles, package seals, certificates of authenticity, gift certificates, etc.

The above applications share some common considerations. In these applications, the holographic or other diffractive structure is best presented and protected by a rigid substrate and overlay lamination, or if these are not used, the application should be one that does not require long circulation life and extensive handling. An over-riding factor is that the application document must depend on a limited array of security devices and a relatively non-skilled observer must be able to easily authenticate the devices. Credit cards, for example, usually depend on one major security device, and secondary devices such as printing techniques, for their authentication. The arsenal of tools available for banknote security (watermarks, intaglio, special paper, threads, etc.) cannot be applied to rigid opaque substrates. The security device of the invention, therefore, can be a very cost-effective "defensive shield" readily discerned by the public, and integrated into the overall style of the security document.

The security devices of the present invention also have the advantage of being suited to automated machine verification, while at the same time preserving an easily remembered feature, namely, a distinct color shift as the viewing angle is changed. Security can be further heightened by the incorporation of digital information that can be compared to the same image in photographic form. While the creative computer hacker might find ways to simulate a simple logo on a decorative holographic substrate, simulation of the color shifting background using an ink-jet printer is not possible and images cannot be created that appear only at certain viewing angles.

While conventional holograms provide an element of protection in document security, such holograms are difficult for the lay person to authenticate decisively since they exhibit eye-catching appeal, but do not naturally lead the observer into a correct determination. Building on the eye-catching appeal of holograms, the security articles of the invention add distinctive elements which are both easy to authenticate and difficult to replicate or simulate.

The following examples are given to illustrate the present invention, and are not intended to limit the scope of the invention.

EXAMPLE 1

Optical coatings composed of color shifting flakes in a polymeric vehicle were formed by a drawdown process on light transmissive substrates composed of PET films containing a holographic image. The drawdown vehicle included two parts lacquer/catalyst and one part color shifting flakes. The color shifting flakes utilized had color shifting properties of green-to-magenta, blue-to-red, and magenta-to-gold.

EXAMPLE 2

A color shifting optical coating having a three-layer design was formed on an embossed transparent film to produce a security article. The optical coating was formed on the flat surface of the transparent film on the side opposite from the embossed surface. The optical coating was formed by depositing an absorber layer composed of chromium on the flat surface of the transparent film, depositing a dielectric layer composed of magnesium fluoride on the absorber layer, and depositing a reflector layer of aluminum on the dielectric layer.

Alternatively, the aluminum layer can be deposited so that it is essentially transparent. This would allow printed information on an object to be read underneath the optical coating. Further, the reflector layer can alternatively be composed of a magnetic material. Such a magnetic feature in the color shifting component when added to the holographic component would give three independent security features to the security article.

The embossed film and optical coating forming the security article can be rigidly affixed to a carrier substrate, or can be attached to a release layer so that the security article can be hot stamped to a surface of an object. In addition, the hot stamped image of the color shifting thin film can be in the form of a pattern, as for example, dots, lines, logos, or other images. This pattern of optically variable effects will add an even greater degree of deterrence to counterfeiting.

EXAMPLE 3

A security article was formed by laminating a laser imaged optical coating structure to an embossed substrate according to the present invention. The security article included four main parts: 1) A laser ablated image, 2) a laser ablated bar code or serial number, 3) a multilayer color shifting thin film, and 4) a holographic image.

The color shifting thin film was deposited in a vacuum roll coater onto a clear polyester (PET) substrate that was 1 mil thick. The thin film was formed by depositing a metal layer of aluminum on the substrate, followed by a dielectric layer composed of magnesium fluoride being deposited on the metal layer, and an absorber layer composed of chromium being deposited on the dielectric layer. Thereafter, the thin film was subjected to laser ablation using a laser diode imaging system based on the Heidelberg Quickmaster printing system to provide digital encoding. The imaging system used a high-resolution diode laser array with a spot size of approximately 30 microns. After the digital information had been encoded into the thin film, a plastic film embossed with a hologram was laminated to the thin film using a pressure sensitive adhesive to produce the completed security article. The hologram word "security" was placed upside down so as to place the embossed surface close to the thin film as well as to protect the image. The finished structure of the security article was similar to that shown for the embodiment of FIG. 14 described above.

Upon visual inspection, the security article had three distinct images as it was rotated back and forth. At normal viewing, a profile of a woman's face created by laser ablation was seen in a magenta color, which at high angle shifted to a green color. This color shift was easy to see under various lighting conditions and it is easy to recall this simple color shift. At an intermediate angle, the hologram appeared with its multitude of facets of color and images.

EXAMPLE 4

The security article of Example 3 was subjected to various tests to measure its optical performance, which are described as follows.

A. Instrumentation and Sample Orientation

Figure 17A:
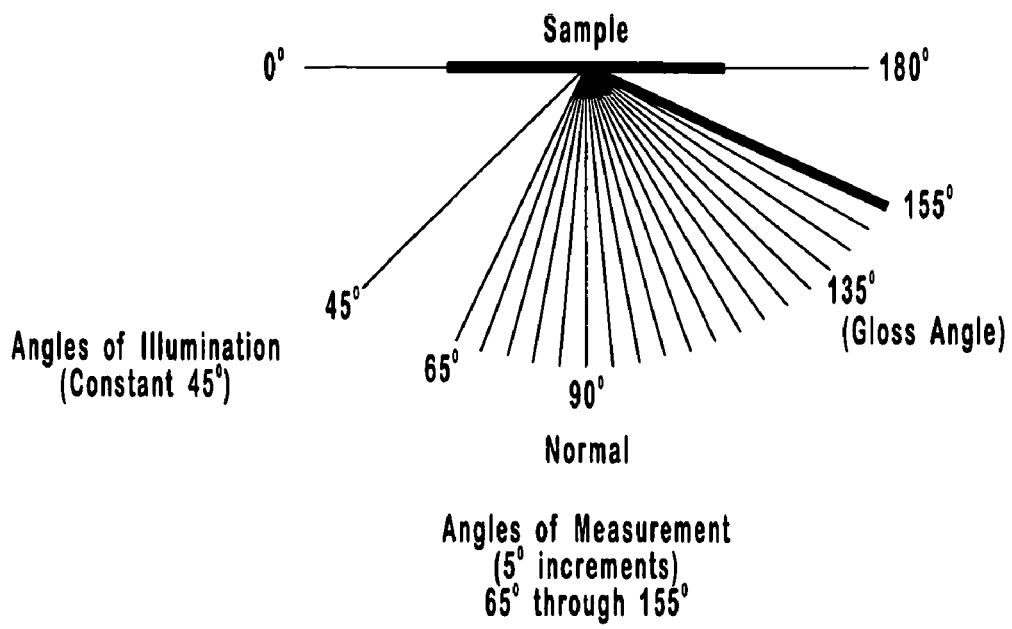
FIGS. 17A and 17B are diagrams showing the geometries of various viewing conditions used in measuring the optical characteristics of a security article of the invention.
Figure 17B:
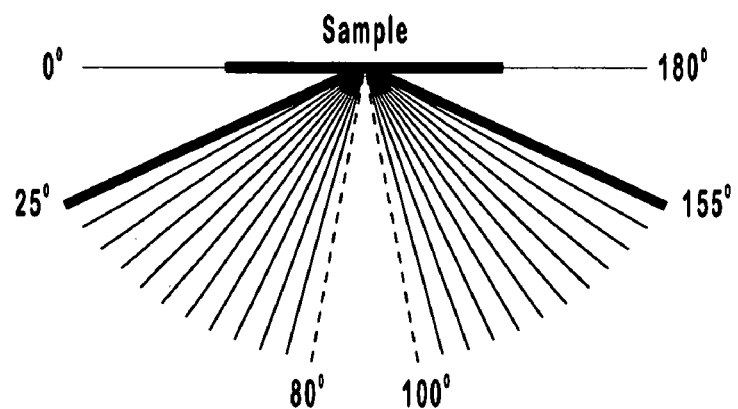

A Zeiss GK/311M goniospectrophotometer using a xenon flash lamp with angle adjustable fiber optics for both illumination and reflectance was used to characterize the security article. Three types of viewing conditions were examined, with the geometries utilized shown in FIGS. 17A and 17B. These viewing conditions included: a) set angle of illumination at 45 degrees, with the angles of measurement being 5 degree increments from 65 through 155 degrees (FIG. 17A); b) off-gloss, with the angles of illumination being 5 degree increments from 25 through 75 degrees and the angles of measurement being 5 degree increments from 100 through 150 degrees (FIG. 17B); and c) on-gloss (specular), with the angles of illumination being 5 degree increments from 25 through 80 degrees and the angles of measurement being 5 degree increments from 100 through 155 degrees (FIG. 17B). Calibration for all these geometries was made with a white tile. To test whether any orientation effects were present, the security article was oriented at 0, 90, 180 and 270 degrees with respect to the viewing optics for each viewing condition.

B. Optical Results

The results of optical testing for the three viewing conditions are described below. The measurements indicate that it is possible to uniquely characterize the interference optically variable effects separately from the diffractive effects.

1. Set Angle of Illumination

Figure 18:
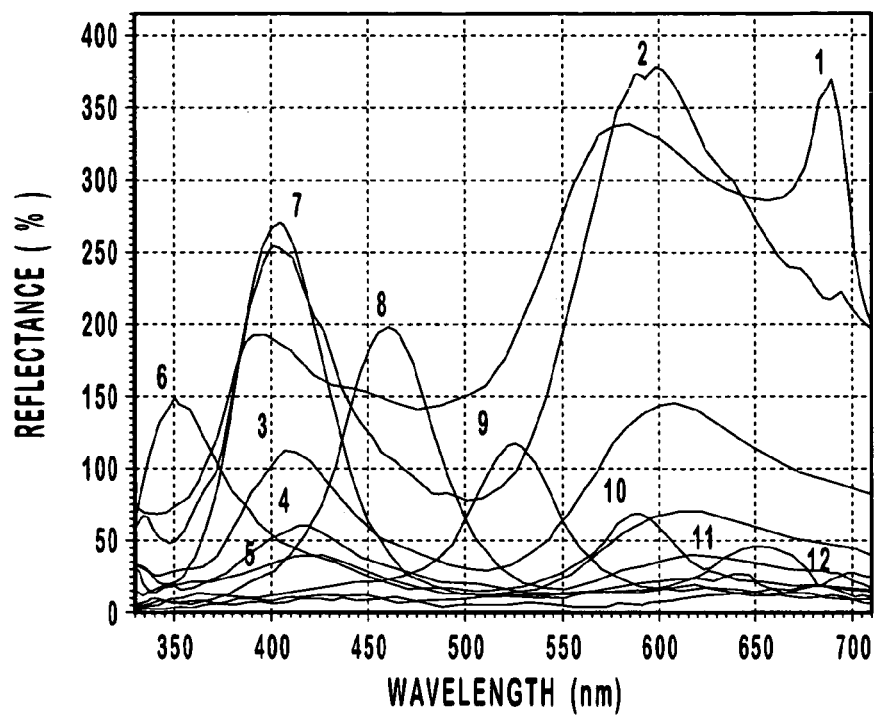
FIG. 18 is a graph showing the spectral profiles for a security article of the invention.
Figure 19:
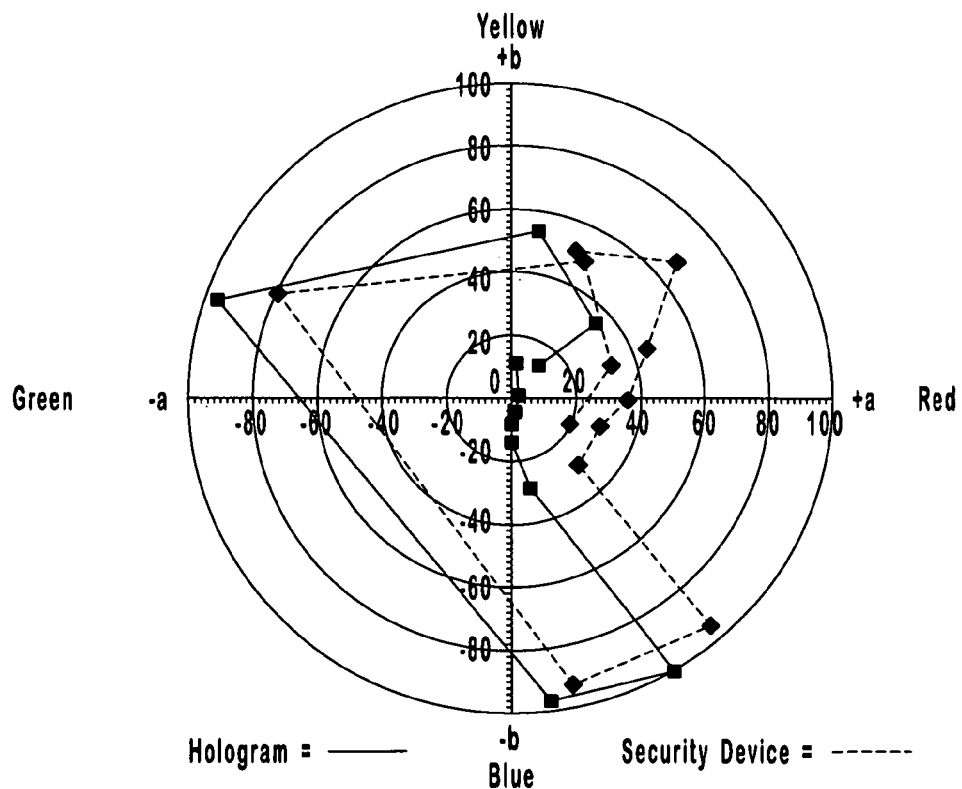
FIG. 19 is a graphical representation of the CIE Lab color space showing trajectory of color for a security article of the invention.

In this configuration, the optical properties of the hologram dominated the spectral response, but only in two orientations, at 90° and 270° (i.e., at 90° to the grooves of the hologram). Inspection of the spectral profiles shown in the graph of FIG. 18 show that the various diffractive orders of the hologram predominate. Only at small and large angle differences does the color shifting thin film show its spectra. A comparison of the color trajectory in CIE Lab color space in FIG. 19 shows that the resultant color travel for the security device is due mostly to the hologram. The chroma or color saturation of the hologram is high as can be seen by the large excursions from the achromatic point ($a^*=b^*=0$).

2. Off-Gloss Geometry

Figure 20:
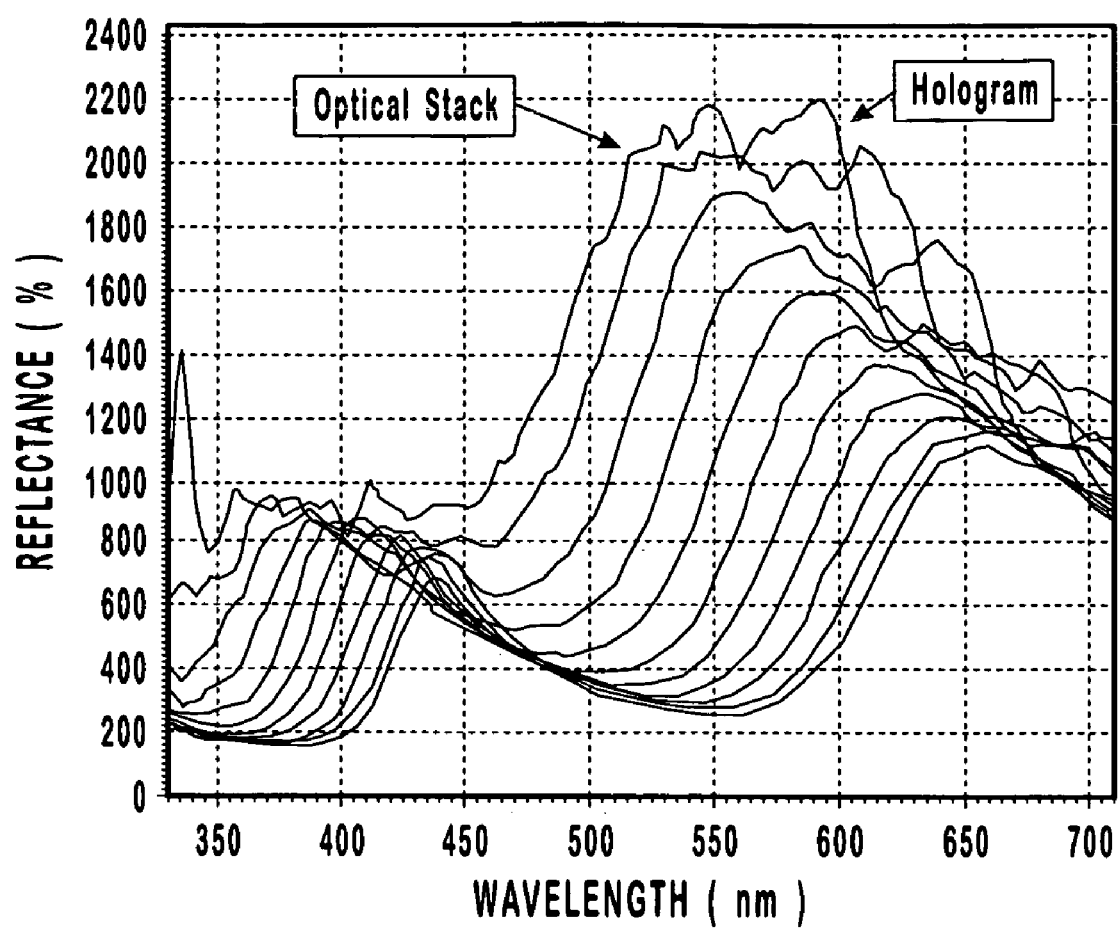
FIG. 20 is a graph showing the off-gloss spectral profiles for a security article of the invention.

In contrast to those spectral profiles found above, the off-gloss measurements showed that in this geometry, the color shifting thin film now dominated the optical response, irrespective of sample orientation. While there was no evidence of optical effects from the hologram in the 0° orientation, combined optical effects from the hologram and the thin film optical stack were seen in the 90° orientation. The spectral peaks arising from the optical stacks were modified as shown in FIG. 20. The spectral profiles are typical of metal-dielectric-absorber optical stacks where the spectrum and the resultant color move to shorter wavelengths as the view angle increases. It is interesting to note that in this configuration, the brightness, L* moves from high to low as the color changes from magenta-to-yellow. At the 0°/180° orientation, the hologram showed no spectral peaks.

3. On-Gloss Geometry

Figure 21:
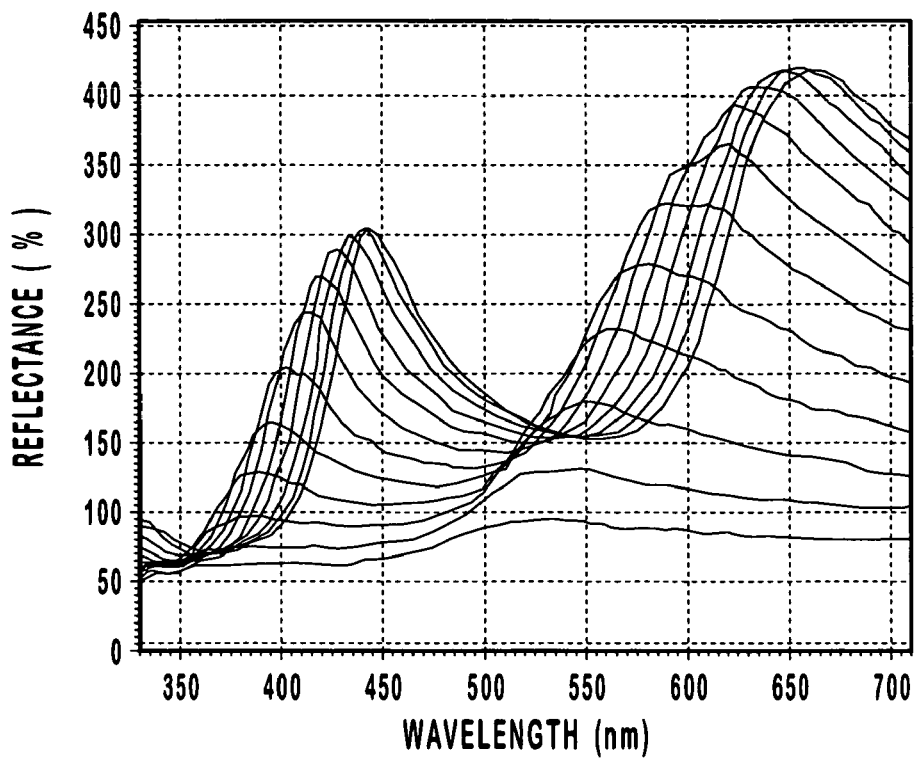
FIG. 21 is a graph showing the on-gloss spectral profiles for a security article of the invention.

In the on-gloss geometry, the security article showed two distinct features: one at 0°, 180° and one at 90°, 270°. In the first orientation, the only optical effect was the one typical from a color shifting thin film where the color shifts to shorter wavelengths as the angle of incidence is increased. FIG. 21 is a graph showing the on-gloss spectral profiles for the security article at the first orientation. The color shifts from magenta to green. Peak suppression occurs progressively as the peaks move toward the shorter wavelengths. This suppression is caused, in part, by the higher reflectance values arising from the standard white tile as well as from the security article itself. Theoretically, the spectra of the thin film retain the same spectrum, but shift to shorter wavelengths as the angle of incidence increases. It should be noted that the on-gloss orientation at 0°, 180° is well suited to machine reading since the peaks are well defined for the optical stack and are free of holographic features.

Figure 22:
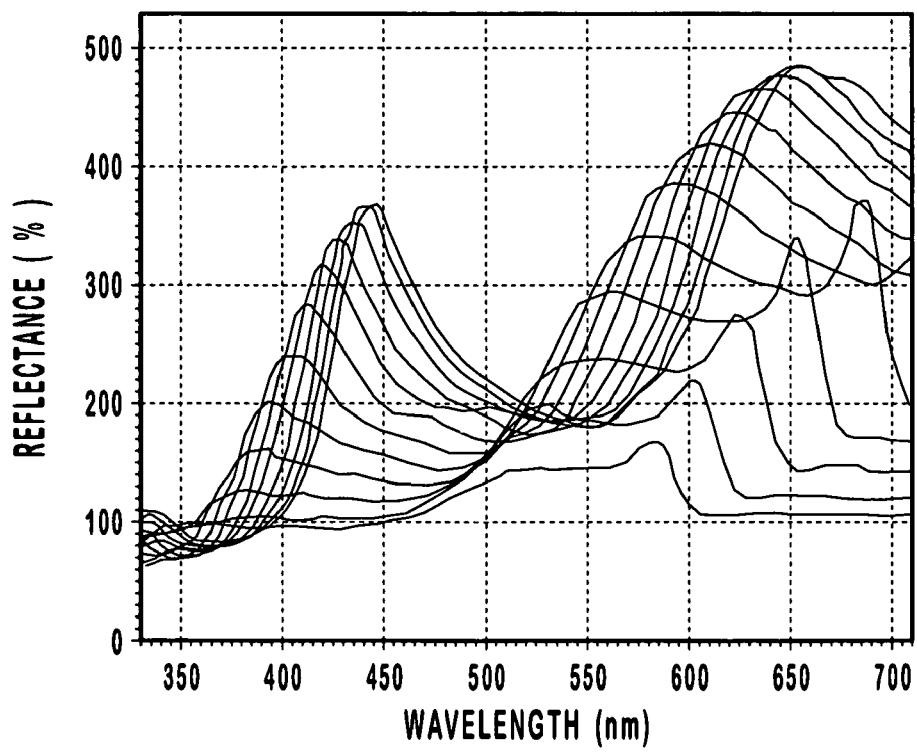
FIG. 22 is a graph showing the on-gloss spectral profiles for a security article of the invention.

In the second orientation, the spectral peaks arising from the optical stack, at the high angles of incidence, show large optical interactions with the hologram. FIG. 22 is a graph showing the on-gloss spectral profiles for the security article at the second orientation.

C. Optical Microscopy

Figure 23:
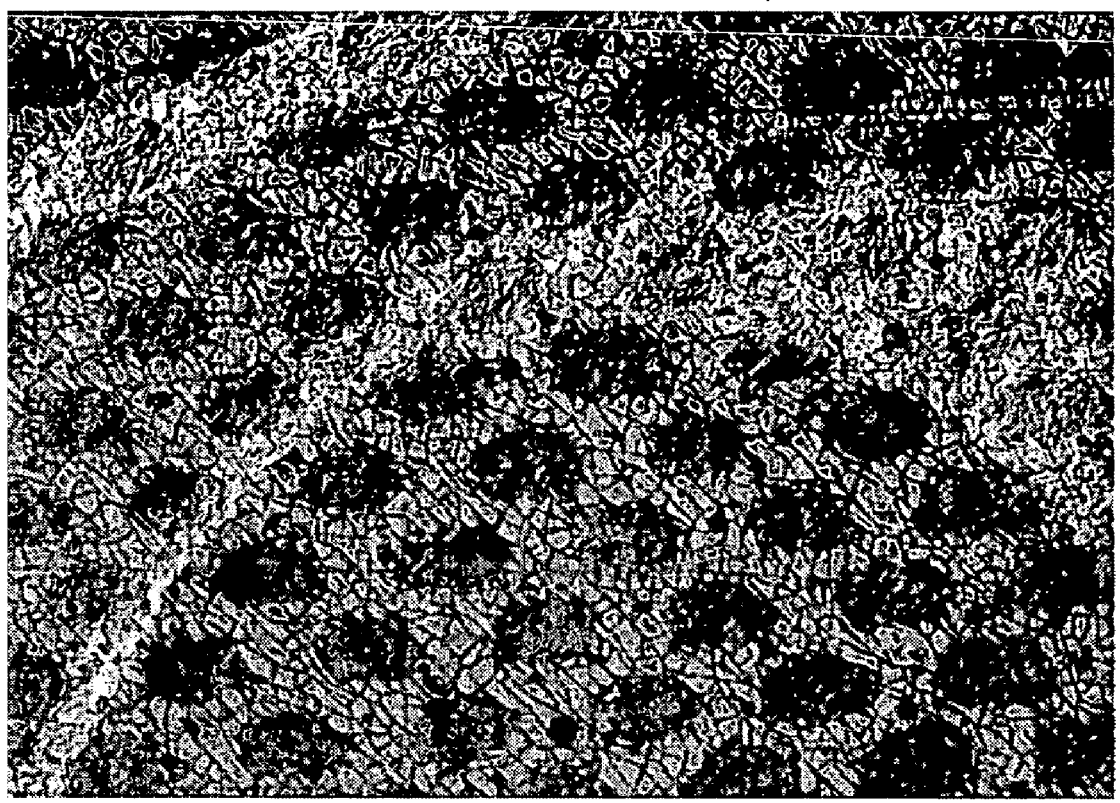
FIG. 23 is a photomicrograph of a thin film optical stack used in a security article of the invention.

The security article was viewed on a Zeiss optical microscope to see the digital features encoded into the color shifting thin film. FIG. 23 is a photomicrograph of the digital image (magnified 50×) in the thin film optical stack of the security article. In FIG. 23, the digital dots (ablation holes), where the entire optical stack is missing, have dimensions on the order of about 100 microns. Each 100 micron pixel is actually made up of 30 micron overlapping digital dots. Thus, it is possible to write covert information with 30–100 micron pixel resolution, a resolution below the eye detection limit. The cracking observed in the coating is typical of dielectric films that have undergone stress relief. These cracks do not have any detrimental effect either on the optical properties or adhesion of the thin film.

EXAMPLE 5

A color shifting optical stack having a three-layer design was formed on an embossed transparent plastic film by direct vacuum coating of the optical stack onto a holographic surface to produce a security article. During the fabrication process, the standard aluminum layer was removed from a commercially available hologram by a dilute solution of sodium hydroxide. After rinsing and drying, the embossed surface was coated in vacuum with a layer of semi-transparent metal, a layer of low index dielectric material, and finally an opaque layer of aluminum, by physical vapor deposition processes. This thin film optical stack was a Fabry-Perot filter centered at 500 nanometers. The layers could be coated in the opposite direction with a corresponding change in which side of the plastic film was modified by the optical stack.

When this construction was viewed through the plastic film, a superposition of the hologram and the optical stack was seen. In essence the rainbow of colors that were in the initial hologram have been modified by the optical stack whereby some colors are accentuated and some are suppressed. Actually, the hologram could be viewed from both sides; on the aluminum side the original hologram can be seen, and on the other side, the superposition of the hologram and the optical stack can be seen through the plastic film.

Figure 24A:
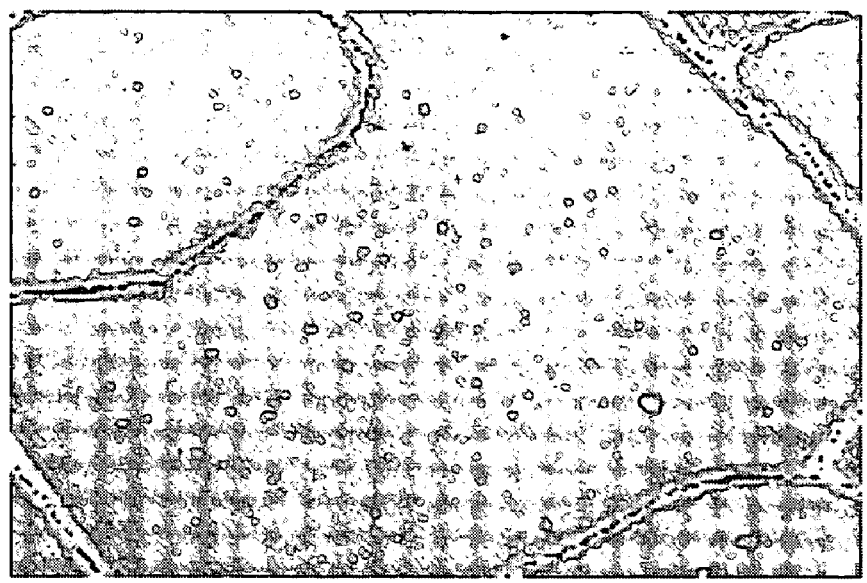
FIGS. 24A and 24B are photomicrographs showing holographic relief at the top of a thin film optical stack used in a security article of the invention.
Figure 24B:
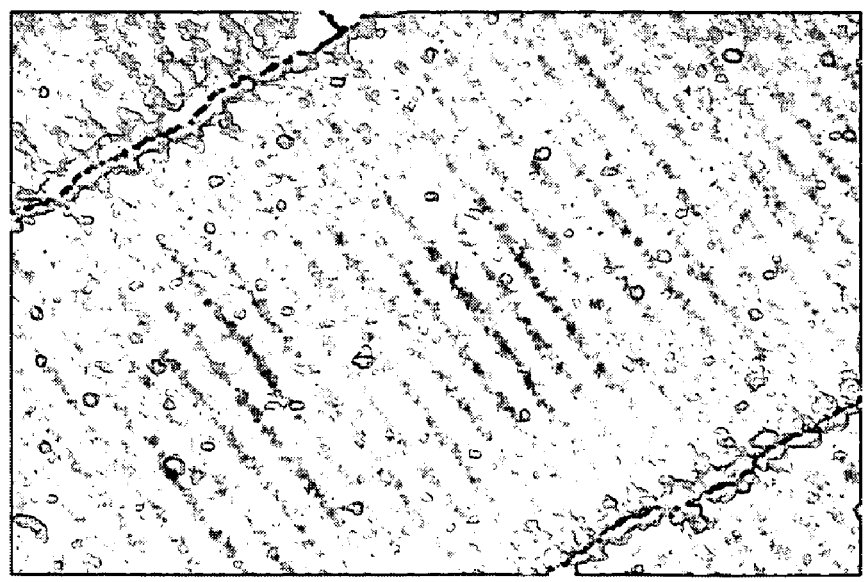

A close examination of the optical stack by scanning electron microscopy (SEM) showed that the diffractive surface pattern of the hologram was replicated up through the optical stack so that the holographic image was preserved in the aluminum surface. This is depicted in FIGS. 24A and 24B, which are photomicrographs of SEM images (magnified 2000× and 6000×, respectively) showing holographic relief at the top of the optical stack of the security article.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed and desire to be secured by United States Letters Patent is:

1. A security article comprising:
a substrate;
a diffractive grating having a grating pattern directly on the surface of the substrate or upon a coating adjacent to the substrate;
an optically variable coating directly on the diffractive grating so that a layer of the optically variable coating adjacent to the diffractive grating conforms to the grating pattern and whereby the grating pattern is replicated into the optically variable coating, wherein the optically variable coating includes an absorber layer, a dielectric layer and a reflector layer for providing an observable color shift as the angle of incident light or viewing angle changes whereby, when the article is irradiated with light, a first visual effect is produced by incident light reflecting from the optically variable coating, a second visual effect is produced by incident light diffracting from the diffractive grating, and a third visual effect is produced by an interaction between light reflecting from the optically variable coating and light diffracted from the diffractive grating.

2. The security article as defined in claim 1, wherein the grating pattern comprises microstructures having dimensions in the range from about 0.1 microns to about 10 microns.

3. The security article as defined in claim 1, wherein
the absorber layer overlies the diffraction grating pattern, the dielectric layer overlies the absorber layer; and the reflector layer overlies the dielectric layer.

4. The security article as defined in claim 1, wherein
the reflector layer overlies the diffraction grating pattern, the dielectric layer overlies the reflector layer; and the absorber layer overlies the dielectric layer.

5. The security article of claim 1, further comprising an adhesive layer overlying the optically variable coating for securing the security article to an object.

6. The security article of claim 1, wherein the diffraction grating pattern is formed on said light transmissive substrate.

7. The security article of claim 1, wherein the diffraction grating pattern is on a layer secured to the light transmissive substrate.

8. The security article of claim 1, wherein the thin film interference optical stack has a laser ablated image.

9. The security article of claim 1, wherein the grating pattern is replicated into the absorber layer, the dielectric layer and into the reflective layer, wherein the device exhibits the diffractive effects in the absence of color shifting if viewed from one side of the device and wherein the device exhibits the diffractive effects in the presence of color shifting if viewed from a second side of the device.

10. The security article of claim 1, further comprising a layer of magnetic material to provide machine readability for security verification.

11. The security article of claim 10, wherein the layer of magnetic material is comprised of cobalt-nickel alloy.

12. The security article as defined in claim 10, wherein reflector layer is segmented to allow for partial viewing of underlying information visually or through the use of optical, electronic, magnetic, or other detector devices.

13. The security article of claim 1, wherein a layer of magnetic material is visibly hidden beneath the reflector layer or wherein a magnetic material forms the reflector layer.

14. The security article as defined in claim 1, wherein reflector layer is segmented to allow for partial viewing of underlying information visually or through the use of optical, electronic, magnetic, or other detector devices.

15. The security article as defined in claim 14, wherein a light beam that reflects off the surface of the device is modified primarily by either the diffraction grating, or the optically variable coating and the diffraction grating.

16. The security article as defined in claim 14, wherein a light beam that reflects off the surface of the device is modified primarily be the diffractive grating, or by the color shifting optical coating.

17. The security article as defined in claim 14, wherein a light beam that reflects off the surface of the device is modified by either (a) the diffraction grating, (b) the optically variable coating, (c) a combination of (a) and (b), or by neither (a) nor (b).

18. The security article as defined in claim 1, wherein the diffractive grating and the optically variable coating are releasable from the substrate.

19. The security article as claimed in claim 1, wherein the dielectric layer is a low refractive index material having a refractive index of about 1.65 or less.

20. The security article as claimed in claim 1, wherein the dielectric layer is a high refractive index material having a refractive index of about 1.65 or greater.

21. The security article as defined in claim 1, wherein the absorber layer is comprised of a material that is absorbing material across a visible wavelength.

22. The security article as defined in claim 1, wherein the reflector layer is aluminum.

23. The security article as defined in claim 1, wherein the diffractive grating is a logo or other discernible information and wherein the optically variable coating consists of only 3 layers.

24. The security article as defined in claim 1, wherein a shear layer is provided between the dielectric layer and the reflector layer.

25. The security article as defined in claim 1, wherein the reflector layer is semi-transparent.

26. The security article as defined in claim 1, wherein the grating pattern is replicated into the absorber layer, the dielectric layer and the reflective layer, and wherein the device exhibits a color shift as a function of viewing angle, where the color shift is a result of diffractive and thin film interference effects interacting with each other.

27. The security article as defined in of claim 26, wherein the color shifting coating changes the diffractive colors, either suppressing, modifying, or enhancing certain colors.

28. The security article as defined in claim 1, wherein a high index transparent layer is placed on the diffractive grating, said high index transparent layer having a refractive index of 1.65 or greater.

29. The security article as defined in claim 1, further comprising means for attaching the security device to a substrate.

30. The security article as defined in claim 29, wherein the means for attaching the security device is one of: hot-stamping, or a UV-activated adhesive.

* * * * *